(12) United States Patent
Takahashi

(10) Patent No.: US 11,264,845 B2
(45) Date of Patent: *Mar. 1, 2022

(54) ROTARY ELECTRICAL MACHINE

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 110 days.

This patent is subject to a terminal disclaimer.

(21) Appl. No.: 16/747,997

(22) Filed: Jan. 21, 2020

(65) Prior Publication Data
US 2020/0161910 A1    May 21, 2020

Related U.S. Application Data

(63) Continuation of application No. PCT/JP2018/026284, filed on Jul. 12, 2018.

(30) Foreign Application Priority Data

Jul. 20, 2017  (JP) .............................. JP2017-140833

(51) Int. Cl.
*H02K 1/14* (2006.01)
*H02K 1/24* (2006.01)
(Continued)

(52) U.S. Cl.
CPC ................. *H02K 1/14* (2013.01); *H02K 1/24* (2013.01); *H02K 1/2706* (2013.01); *H02K 3/28* (2013.01);
(Continued)

(58) Field of Classification Search
CPC .... H02K 1/243; H02K 21/044; H02K 21/048; H02K 1/223; H02K 21/04; H02K 21/042;
(Continued)

(56) References Cited

U.S. PATENT DOCUMENTS 7,592,785 B2 * 9/2009 Kimura .................. H02P 21/14
322/59
10,958,202 B2 * 3/2021 Taniguchi .............. H02K 1/276
(Continued)

FOREIGN PATENT DOCUMENTS

JP        H04-255451 A      9/1992

OTHER PUBLICATIONS

U.S. Appl. No. 16/748,064, filed Jan. 21, 2020 in the name of Yuki Takahashi.

*Primary Examiner* — Ahmed Elnakib
(74) *Attorney, Agent, or Firm* — Oliff PLC

(57) ABSTRACT

A rotary electrical machine includes a switch for supplying power to a field winding and a controller. A ratio of an on-time to a switching cycle of the switch, i.e., a duty ratio which is larger than the duty ratio corresponding to the field current that gives the maximum reduction amount of the inductance of the field winding with respect to an increasing amount of the field current in a range that the field current can take and which has a predetermined value less than 100%. The controller calculates the duty ratio on the condition that an upper limit of the duty ratio is set as the predetermined value and turns on/off the switch based on the calculated duty ratio, and sets the predetermined value to be larger as a rotation speed of a rotor is higher, or as a d-axis current flowing through an armature winding is larger.

20 Claims, 14 Drawing Sheets

(51) Int. Cl.
| | |
|---|---|
| *H02K 1/27* | (2006.01) |
| *H02K 3/28* | (2006.01) |
| *H02K 21/04* | (2006.01) |
| *H02K 21/14* | (2006.01) |
| *H02P 27/06* | (2006.01) |
| *H02K 1/2706* | (2022.01) |

(52) U.S. Cl.
CPC ........... *H02K 21/044* (2013.01); *H02K 21/14* (2013.01); *H02P 27/06* (2013.01)

(58) Field of Classification Search
CPC .......... H02K 1/14; H02K 1/24; H02K 1/2706; H02K 3/28; H02K 21/14; H02P 27/06; H02P 21/0085; H02P 6/32; H02P 9/30
USPC .................. 310/263, 156.66, 156.69, 156.71
See application file for complete search history.

(56) References Cited

U.S. PATENT DOCUMENTS

| | | | | |
|---|---|---|---|---|
| 2019/0131833 A1* | 5/2019 | Takahashi | ............. | H02K 19/22 |
| 2019/0341867 A1* | 11/2019 | Taniguchi | ............. | H02K 19/26 |
| 2020/0161910 A1* | 5/2020 | Takahashi | ................ | H02P 9/30 |
| 2020/0161950 A1* | 5/2020 | Takahashi | ............. | H02K 1/243 |
| 2020/0161951 A1* | 5/2020 | Takahashi | ................ | H02P 9/30 |

* cited by examiner (∴As>Ab)

ROTARY ELECTRICAL MACHINE

CROSS-REFERENCE TO RELATED APPLICATION

This application is the U.S. bypass application of International Application No. PCT/JP2018/026284 filed on Jul. 12, 2018 which designated the U.S. and claims priority to Japanese Patent Application No. 2017-140833, filed on Jul. 20, 2017, the contents of which are incorporated herein by reference.

TECHNICAL FIELD

The present disclosure relates to a rotary electrical machine.

BACKGROUND

Conventionally, as shown in JP H4-255451 A, for example, a rotary electrical machine having an annular stator with a stator core around which an armature winding is wound, and a rotor arranged on an inner circumference side of the stator is known. The rotor includes a field core and a field winding. The field core has a cylindrical boss part and a plurality of claw-like magnetic pole parts arranged on an outer circumferential side of the boss part and having magnetic poles with alternately different polarities formed in a circumferential direction. The field winding is wound on the outer circumferential side of the boss part and generates a magnetomotive force by supplying a field current.

SUMMARY

A rotary electrical machine in a first aspect includes an annular stator having a stator core around which an armature winding is wound, and a rotor arranged on an inner circumference side of the stator. The rotor includes a field core having a cylindrical boss part and a plurality of claw-like magnetic pole parts arranged on an outer circumferential side of the boss part and having magnetic poles with alternately different polarities formed in a circumferential direction of the rotor, and a field winding that is wound on the outer circumferential side of the boss part and generates a magnetomotive force by supplying a field current. In a case where a magnetic circuit in which a magnetic flux formed by a magnetomotive force of the field winding flows and which passes through a d-axis via the boss part, a pair of the claw-like magnetic pole parts and the stator core is referred to as a d-axis magnetic circuit, and a magnetic circuit which is formed by a current flowing through the armature winding and which passes through a q-axis shifted by 90° in an electric angle from the d-axis is referred to as a q-axis magnetic circuit, a permeance of the q-axis magnetic circuit is made larger than a permeance of the d-axis magnetic circuit. The first aspect further includes a switch provided so as to supply power from a power source to the field winding by being turned on and stop supplying power from the power source to the field winding by being turned off; and a controller that, in a case where a ratio of an on-time to one switching cycle of the switch is defined as a duty ratio, and a duty ratio which is larger than the duty ratio corresponding to the field current that gives the maximum reduction amount of the inductance of the field winding with respect to an increasing amount of the field current in a range that the field current can take and which has a value less than 100% is set as a predetermined value, calculates the duty ratio on the condition that an upper limit of the duty ratio is set as the predetermined value and turns on/off the switch based on the calculated duty ratio, and the controller sets the predetermined value to be larger as a rotation speed of the rotor is higher, or as a d-axis current flowing through the armature winding is larger.

BRIEF DESCRIPTION OF THE DRAWINGS

The above-described objects, other objects, features, and advantages of the present disclosure will become more apparent from the following detailed description with reference to the accompanying drawings. In the accompanying drawings.

DETAILED DESCRIPTION OF THE PREFERRED EMBODIMENTS

Figure 1:
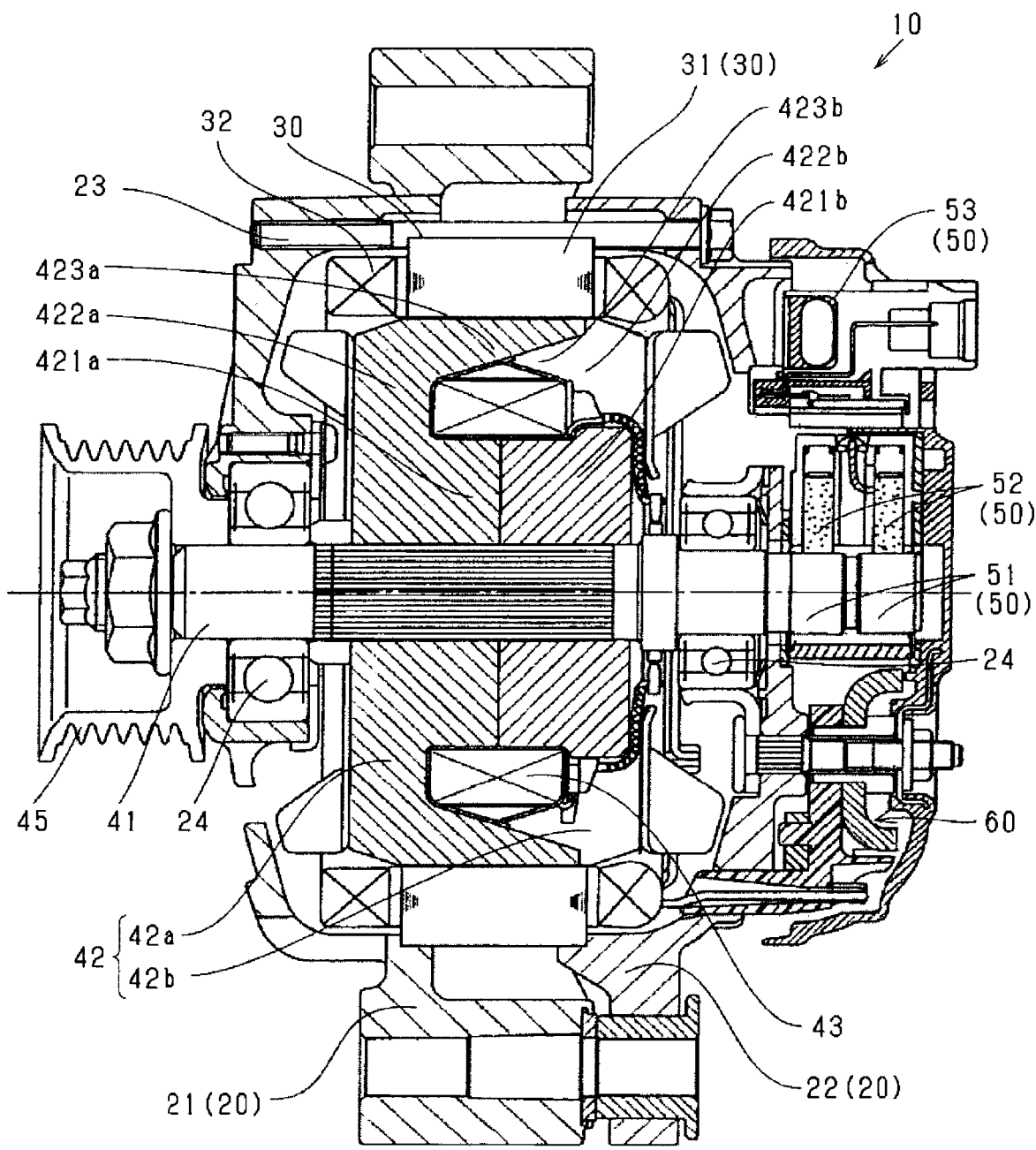
FIG. 1 is a sectional diagram of a rotary electrical machine according to a first embodiment.
Figure 2:
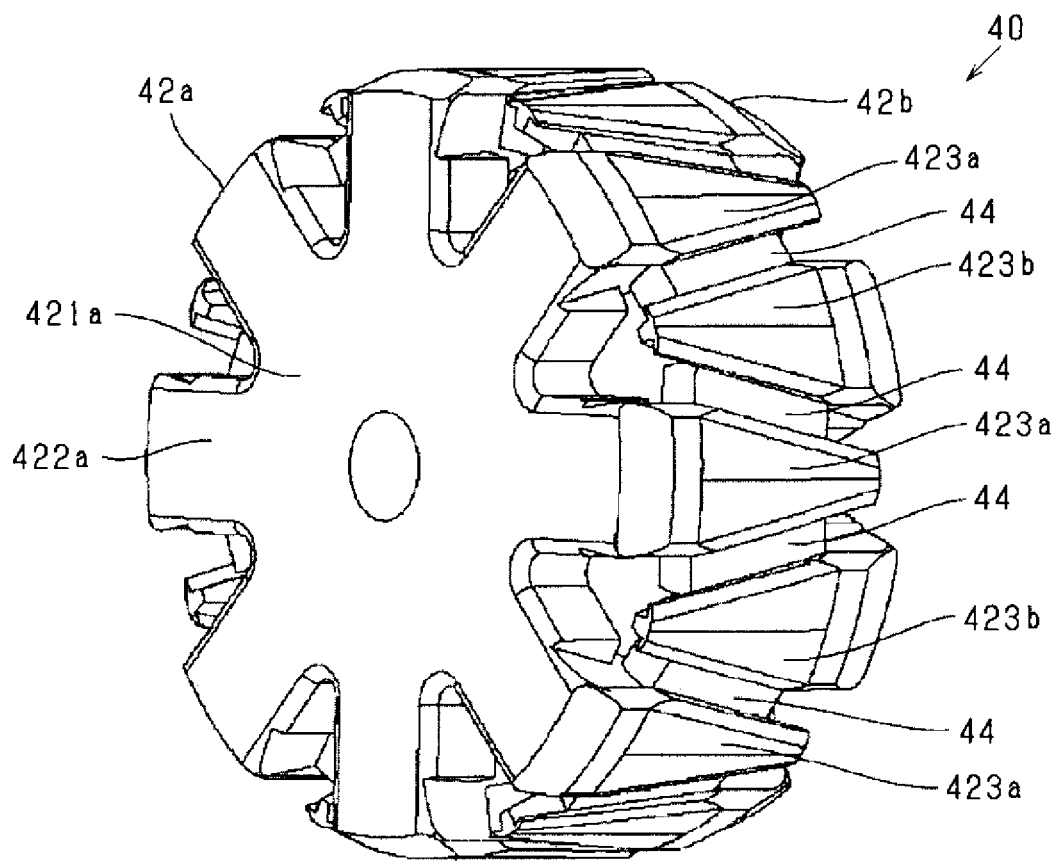
FIG. 2 is a perspective view of a rotor.
Figure 3:
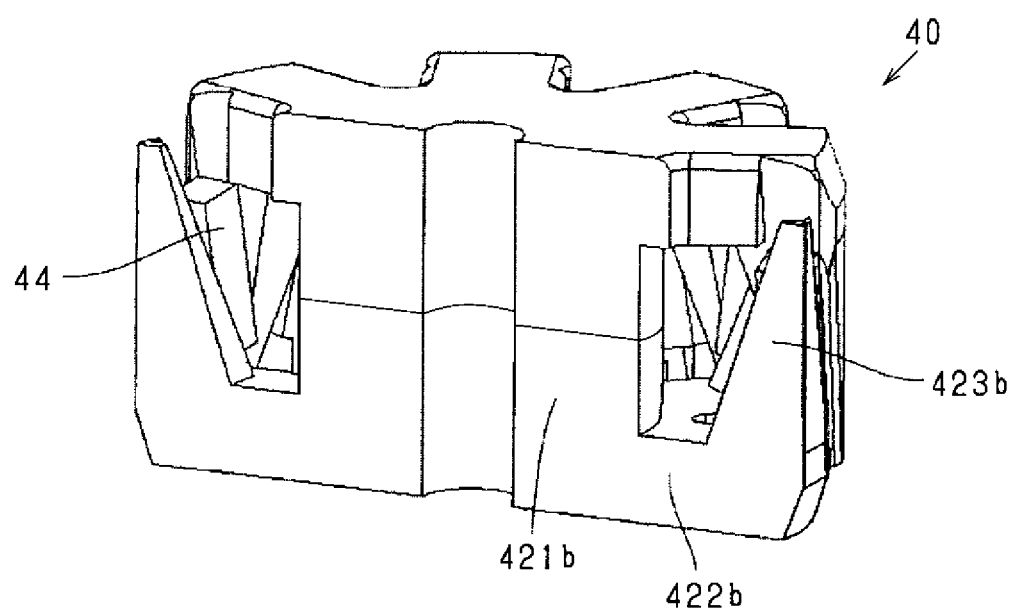
FIG. 3 is a sectional diagram of the rotor.

In recent years, for example, in an on-vehicle rotary electrical machine, a need for high output is increasing. In response to this need, the discloser of the present application has created a configuration described below. A magnetic circuit in which a magnetic flux formed by a magnetomotive force of a field winding flows and which passes through a d-axis via a boss part, a pair of claw-like magnetic pole parts and a stator core is referred to as a d-axis magnetic circuit, and a magnetic circuit which is formed by a current flowing through an armature winding and which passes through a q-axis shifted by 90° in an electric angle from the d-axis is referred to as a q-axis magnetic circuit. In this case, the permeance of the q-axis magnetic circuit is made larger than the permeance of the d-axis magnetic circuit. According to this configuration, a torque of the rotary electrical machine can be substantially improved, and for example, when the rotary electrical machine is used as a power generator, a power generation capacity can be substantially improved.

In a magnetic circuit, the permeance and the inductance of the field winding are inversely proportional to the magnetic resistance of the rotor. With a configuration in which the permeance of the q-axis magnetic circuit is made larger than the permeance of the d-axis magnetic circuit, when the field current flows, at least part of the field core is apt to be magnetically saturated. As a result, the discloser of the present application has found that when the field current is increased, before the torque of the rotary electrical machine reaches its maximum value, the phenomenon that the inductance of the field winding sharply decreases occurs. Specifically, it is found that the phenomenon that the inductance is reduced by an order of magnitude occurs. Although the inductance of the field winding is saturated and its value becomes small, a field magnetic flux quantity can be made sufficiently large by supplying a large field current, and the torque of the rotary electrical machine can be substantially improved. However, a time constant τ sharply decreases and becomes small accompanying the sharp reduction of the inductance. The time constant τ is, for example, represented by Lrt/Rrt in a general electrical circuit including a field winding, where the inductance of the field winding is Lrt and the resistance of the field winding is Rrt. When the time constant becomes small, the ripple of the field current becomes large, and there is a concern that controllability of the field current may be greatly lowered.

Incidentally, when a circuit having a small time constant is controlled, a measure for improving the control amount of the field current by raising a switching frequency of a switch constituting the circuit is conceivable. However, this measure increases a switching loss to increase a heat generation amount, and as a result, a heat radiation measure or the like for suppressing reduction in reliability of the switch is required.

The present disclosure has a main object to provide a rotary electrical machine capable of suppressing reduction in controllability of the field current.

A rotary electrical machine in a first aspect includes an annular stator having a stator core around which an armature winding is wound, and a rotor arranged on an inner circumference side of the stator. The rotor includes a field core having a cylindrical boss part and a plurality of claw-like magnetic pole parts arranged on an outer circumferential side of the boss part and having magnetic poles with alternately different polarities formed in a circumferential direction of the rotor, and a field winding that is wound on the outer circumferential side of the boss part and generates a magnetomotive force by supplying a field current therethrough. In a case where a magnetic circuit in which a magnetic flux formed by a magnetomotive force of the field winding flows and which passes through a d-axis via the boss part, a pair of the claw-like magnetic pole parts and the stator core is referred to as a d-axis magnetic circuit, and a magnetic circuit which is formed by a current flowing through the armature winding and which passes through a q-axis shifted by 90° in an electric angle from the d-axis is referred to as a q-axis magnetic circuit, a permeance of the q-axis magnetic circuit is made larger than a permeance of the d-axis magnetic circuit. The first aspect further includes a switch provided so as to supply power from a power source to the field winding by being turned on and stop supplying power from the power source to the field winding by being turned off; and a controller that, in a case where a ratio of an on-time to one switching cycle of the switch is defined as a duty ratio, and a duty ratio which is larger than the duty ratio corresponding to the field current that gives the maximum reduction amount of the inductance of the field winding with respect to an increasing amount of the field current in a range that the field current can take and which has a value less than 100% is set as a predetermined value, calculates the duty ratio on the condition that an upper limit of the duty ratio is set as the predetermined value and turns on/off the switch based on the calculated duty ratio, and the controller sets the predetermined value to be larger as a rotation speed of the rotor is higher, or as a d-axis current flowing through the armature winding is larger.

The controller of the first aspect calculates the duty ratio on the condition that an upper limit of the duty ratio is set as the predetermined value and turns on/off the switch based on the calculated duty ratio. The predetermined value is set to a value which is larger than the duty ratio corresponding to the field current that gives the maximum reduction amount of the inductance of the field winding with respect to an increasing amount of the field current in a range that the field current can take and which has a value less than 100%. According to this setting, the field current can be made to flow immediately before the inductance of the field winding saturates, and ripple of the field current can be suppressed. This makes it possible to suppress reduction in controllability of the field current.

Conventionally, since a large torque is required during low-speed rotation of the rotor, the field current is set to be larger as the rotation speed of the rotor is lower. However, in the first aspect, the permeance of the q-axis magnetic circuit is made larger than the permeance of the d-axis magnetic circuit. With this configuration, a large torque can be obtained even during low-speed rotation of the rotor. Furthermore, in order to obtain a larger torque during high-speed rotation of the rotor, the controller of the first aspect sets the predetermined value larger as the d-axis current is larger. That is, the controller sets the upper limit value of the field current larger as the d-axis current is larger. The field current acts in a direction of promoting magnetic saturation of the rotor, whereas the d-axis current generates armature reaction and acts in a direction of relaxing magnetic saturation of the rotor. Therefore, when the predetermined value is set to be larger as the d-axis current is larger, it is possible to increase the torque of the rotary electrical machine while suppressing the reduction in controllability of the field current. Here, the d-axis current has a positive correlation with the rotation speed of the rotor. Thus, the controller can set the predetermined value to be larger as the rotation speed of the rotor is higher.

Incidentally, in the configuration in which the permeance of the q-axis magnetic circuit is made larger than the permeance of the d-axis magnetic circuit, when the field current is increased during low-speed rotation of the rotor, the inductance of the field winding sharply decreases and the ripple of the field current increases before the torque of the rotary electrical machine reaches its maximum value, and there is a concern that the control of the field current may become unstable.

In a second aspect, the rotor includes a permanent magnet arranged between the claw-like magnetic pole parts adjacent to each other in a circumferential direction with an axis of easy magnetization directed in the circumferential direction of the rotor and having magnetic poles formed so that their polarities match polarities that are alternately induced in the claw-like magnetic pole parts due to the magnetomotive force of the field winding.

According to the second aspect, the d-axis magnetic circuit and at least part of the magnet magnetic circuit through which the magnetic flux formed by the magnetic force of the permanent magnet are shared. In the shared portion of the magnet magnetic circuit and the d-axis magnetic circuit, the magnet magnetic flux flowing through the magnet magnetic circuit flows in a direction opposite to that of the magnetic flux flowing through the d-axis magnetic circuit. Therefore, the above shared portion has a large magnetic resistance and the magnetic flux hardly flows therethrough. This makes it possible to reduce the inductance of the field winding and to increase the magnetic fluxes crossing the armature winding among the magnetic fluxes formed by the permanent magnet. As a result, it is possible to increase composite magnetic fluxes that are composite magnetic fluxes of the magnetic fluxes formed by the magnetomotive force of the field winding and the magnetic fluxes formed by the permanent magnet and cross the armature winding and to increase the torque of the rotary electrical machine.

In a third aspect, the amount of ampere-turns of the field winding at which magnetic saturation of the field core occurs is made lower than the amount of ampere-turns of the armature winding at which magnetic saturation of the stator core occurs.

In the third aspect, reduction of the time constant of the electrical circuit including the field winding due to the sharp decrease of the inductance of the field winding is noticeable. With the configuration in which the reduction of the time constant is noticeable, the merit of including the switch and the controller and of setting the predetermined value as described above is large.

In a fourth aspect, a saturated magnetic flux quantity of the field core is made smaller than a saturated magnetic flux quantity of the stator core.

In the fourth aspect, the magnetomotive force necessary for saturation of the inductance of the field winding is inevitably lower than the magnetomotive force of the armature winding during torque generation of the rotary electrical machine. As a result, reduction of the time constant of the electrical circuit including the field winding due to the sharp decrease of the inductance of the field winding is noticeable. With the configuration in which the reduction of the time constant is noticeable, controllability of the field current is apt to decrease significantly, and thus the merit of including the switch and the controller and of setting the predetermined value as described above is large.

In a fifth aspect, the amount of ampere-turns of the field winding at which magnetic saturation of the field core occurs is made lower than the amount of ampere-turns of the armature winding at which magnetic saturation of the stator core occurs.

According to the fifth aspect, an increasing effect of the magnetic fluxes by the permanent magnet can be brought about more effectively.

In a sixth aspect, a saturated magnetic flux quantity of the field core is made smaller than a saturated magnetic flux quantity of the stator core.

According to the sixth aspect, an increasing effect of the magnetic fluxes by the permanent magnet can be brought about more effectively.

In a seventh aspect, a surface area of a surface opposite to the stator in the rotor is made larger than a value obtained by dividing the sectional area of the boss part when the boss part is seen in its axial direction by the number of pole pairs of the rotary electrical machine.

According to the seventh aspect, the permeance from the magnetic pole of the rotor to the stator can be increased, and a diamagnetic field acting on the permanent magnet can be reduced.

For this reason, an increase in magnetic fluxes produced by the permanent magnet can be brought about more effectively.

In an eighth aspect, a magnetic path sectional area of one part of the field core is made smaller than a magnetic path sectional area of the other part, so that the permeance of the q-axis magnetic circuit is made larger than the permeance of the d-axis magnetic circuit.

According to the eighth aspect, the magnetic saturation is easily caused at one part of the field core having smaller magnetic path sectional area. As a result, the magnetic flux of the permanent magnet easily crosses the armature winding, and the permeance of the q-axis magnetic circuit can be made larger than the permeance of the d-axis magnetic circuit. On this occasion, since the permeance design can be realized by the shape of the field core, the design and processing of the field core can be easily realized.

A ninth aspect includes an inverter electrically connected to the armature winding, and the controller controls the inverter so that the field current is larger than the d-axis current. According to the ninth aspect, it is possible to cause the rotary electrical machine to generate a torque while exhibiting an effect of suppressing saturation of the inductance of the field winding. In addition, in a tenth aspect embodying the eleventh aspect, the controller controls the inverter so that the field current becomes larger as the d-axis current becomes larger.

Note that, in an eleventh aspect, the field core includes a cylindrical boss part provided closer to an inner circumference side of the rotor than the field winding; a plurality of disk parts extending outward in a radial direction of the boss part from an axial one end of the boss part and provided at a predetermined angular interval in the circumferential direction of the boss part; and a plurality of claw-like magnetic pole parts extending in an axial direction of the boss part so as to surround the field winding from tips of the disk parts and having magnetic poles with alternately different polarities formed in the circumferential direction of the rotor, and when a value obtained by dividing a sectional area of the boss part when the boss part as seen in its axial direction by the number of pole pairs of the rotary electrical machine is Ab, a sectional area of the disk part is Ad, a sectional area of an annular yoke constituting the stator core is Acb, and a sectional area of a tooth per magnetic pole of the plurality of teeth constituting the stator core is At, a smaller one of Ab and Ad is made larger than a smaller one of Acb and At.

According to the eleventh aspect, the permeance of the q-axis magnetic circuit can be made larger than the permeance of the d-axis magnetic circuit.

First Embodiment

Hereinafter, a first embodiment embodying a rotary electrical machine according to the present disclosure will be described with reference to drawings. The rotary electrical machine of the present embodiment is used as an on-vehicle power generator.

As shown in FIG. 1 to FIG. 9, a rotary electrical machine 10 includes a housing 20, a stator 30, a rotor 40, a field supply part 50, and a rectifier 60. The housing 20 includes a front housing 21 and a rear housing 22. Each housing 21, 22 has a bottomed cylindrical shape with one end opened. The front housing 21 and the rear housing 22 are fastened by a fastening member 23 such as a bolt with openings abutting on each other.

Figure 4:
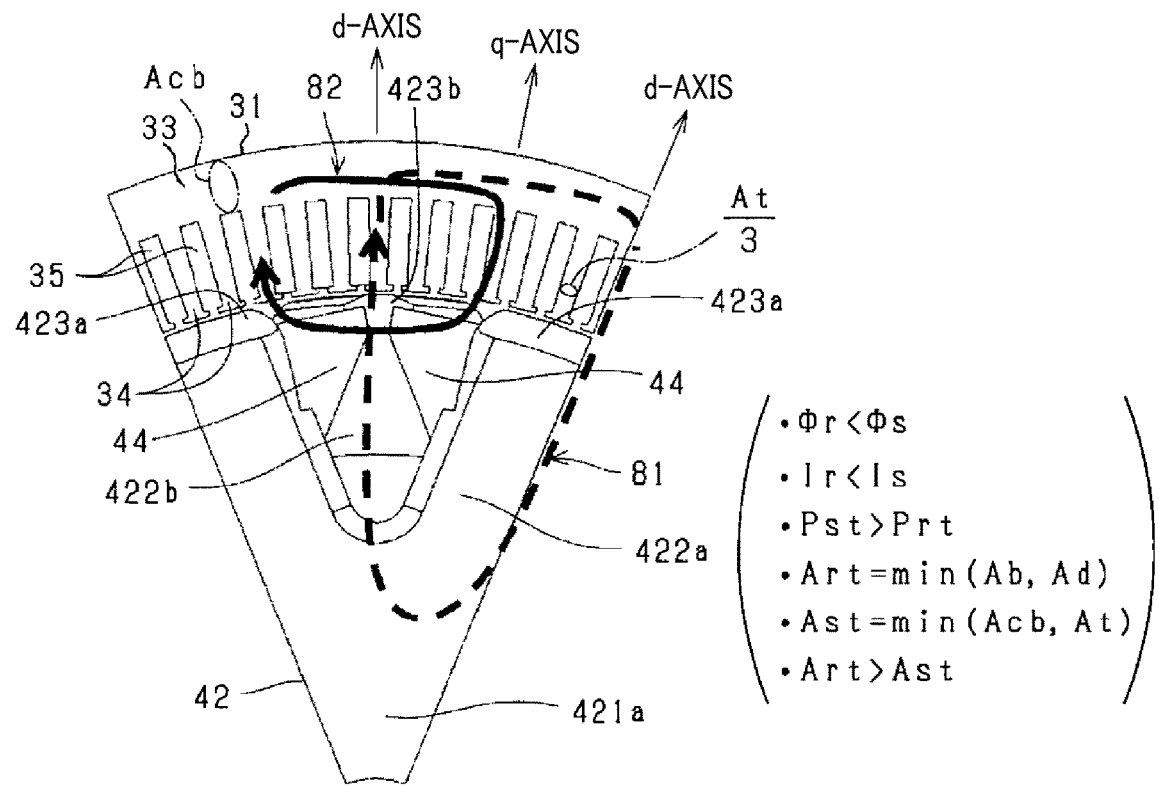
FIG. 4 is a diagram showing an outline of d, q-axis magnetic circuits.

The stator 30 includes an annular stator core 31 and an armature winding 32. The stator 30 is fixed to inner circumferential wall surfaces of the front housing 21 and the rear housing 22. The stator core 31 has, as shown in FIG. 4, an annular yoke 33 and a plurality of teeth 34 which protrude radially inward from the yoke 33 and are arranged at a predetermined pitch in a circumferential direction, and a slot 35 is formed between the adjacent teeth 34. Each of the teeth 34 is provided at equal intervals in the circumferential direction. Each slot 35 has an opening shape extending with the radial direction of the stator core 31 as the longitudinal direction. In the present embodiment, 96 slots 35 are formed at equal intervals in the circumferential direction of the stator core 31. The armature winding 32 has a three-phase winding and is wound around the slot 35.

The rotor 40 includes a rotary shaft 41, a field core 42, a field winding 43, and a plurality of permanent magnets 44. The rotary shaft 41 is rotatably supported via a pair of bearings 24 provided on the housing 20. The field core 42 is a Lundell-type core having first and second pole cores 42a, 42b fixed to an outer periphery of the rotary shaft 41. The rotor 40 is rotatably provided on the inner circumferential side of the stator 30. The rotor 40 is rotationally driven by an engine (not shown) mounted on a vehicle via a pulley 45 fixed to a front end portion of the rotary shaft 41.

The first pole core 42a is fixed to a front end side of the rotary shaft 41, and the second pole core 42b is fixed to a rear end side of the rotary shaft 41. The first pole core 42a is a soft magnetic body and includes a first boss part 421a, a first disk part 422a, and a first claw-like magnetic pole part 423a. In the present embodiment, the first boss part 421a, the first disk part 422a, and the first claw-like magnetic pole part 423a are integrally molded to form the first pole core 42a. The first boss part 421a is cylindrical. The first boss part 421a has a function of flowing a field magnetic flux on an inside of the field winding 43 in the radial direction in its axial direction. The first disk part 422a extends radially outward from an axial one end of the first boss part 421a and has a function of flowing a field magnetic flux in the radial direction. The first disk part 422a is provided in plural numbers at a predetermined pitch in the circumferential direction. In the present embodiment, eight first disk parts 422a are provided at equal interval in the circumferential direction. The first claw-like magnetic pole part 423a extends in the axial direction so as to surround the field winding 43 from the tip of the first disk part 422a on the outer circumferential side of the first boss part 421a and has a function of exchanging magnetic fluxes with the stator core 31. The first claw-like magnetic pole part 423a is provided corresponding to the first disk part 422a and specifically eight ones are provided. The first claw-like magnetic pole part 423a has a trapezoidal shape with its root side as a long side and its tip side as a short side, and the sectional area becomes smaller as it goes from the root side toward the tip side.

The second pole core 42b is a soft magnetic body and includes a second boss part 421b, a second disk part 422b, and a second claw-like magnetic pole part 423b. In the present embodiment, the shape of the second pole core 42b is the same as the shape of the first pole core 42a. Therefore, a detailed description of the second boss part 421b, the second disk part 422b, and the second claw-like magnetic pole part 423b will be omitted.

The first pole core 42a and the second pole core 42b are in a state in which the first claw-like magnetic pole parts 423a and the second claw-like magnetic pole parts 423b are made to face each other alternately, and an axial rear end surface of the first pole core 42a and an axial front end surface of the second pole core 42b are abutted to each other. Thereby, the first claw-like magnetic pole parts 423a and the second claw-like magnetic pole parts 423b are arranged alternately in the circumferential direction. Therefore, in the present embodiment, each pole core 42a, 42b has eight N poles and eight S poles and constitutes a Lundell-type rotor core having 16 poles.

The field winding 43 is wound on the outer circumferential side of the first and second boss parts 421a and 421b in a state of being isolated from the field core 42 and is surrounded by the first and second claw-like magnetic pole parts 423a and 423b.

As shown in FIG. 2 to FIG. 5, the rotor 40 includes the permanent magnet 44 arranged between the first claw-like magnetic pole part 423a and the second claw-like magnetic pole part 423b adjacent to each other in the circumferential direction. In the present embodiment, 16 permanent magnets 44 are provided. The permanent magnet 44 has a rectangular shape and its magnetization-easy axis is directed in the circumferential direction of the rotor 40. In a state in which the magnetic pole of one end of the permanent magnet 44 is abutted to the first claw-like magnetic pole part 423a and the magnetic pole of the other end of the permanent magnet 44 is abutted to the second claw-like magnetic pole part 423b, the permanent magnet 44 is held by each claw-like magnetic pole part 423a, 423b. When the field current flows through the field winding 43, a magnetomotive force is generated in each boss part 421a, 421b. Thereby, magnetic poles having different polarities are formed in the first and second claw-like magnetic pole parts 423a and 423b, respectively. That is, of the N and S magnetic poles, the first claw-like magnetic pole part 423a is magnetized to one polarity and the second claw-like magnetic pole part 423b is magnetized to the other polarity. In this case, in the permanent magnet 44, the magnetic poles are formed so as to match polarities alternately appearing in the first and second claw-like magnetic pole parts 423a and 423b by the magnetomotive force of the field winding 43.

Figure 9:
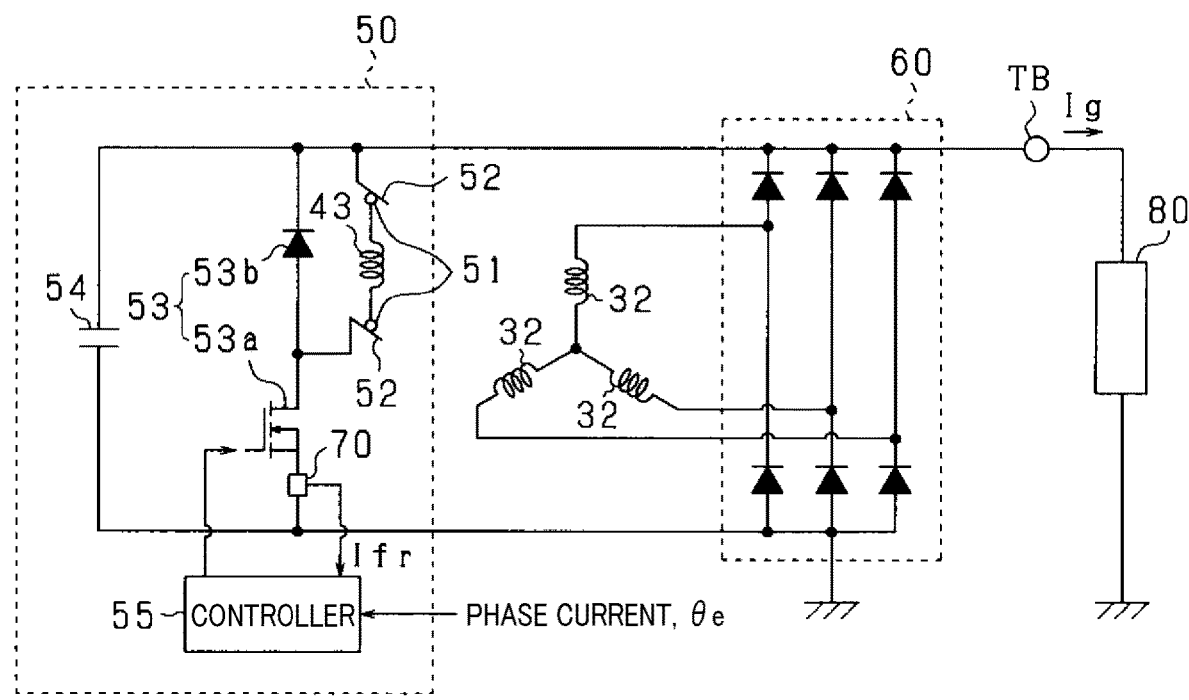
FIG. 9 is a diagram showing an electrical configuration of the rotary electrical machine.

As shown in FIG. 1 and FIG. 9, the field supply part 50 includes one pair of slip rings 51, one pair of brushes 52, a regulator 53, and a capacitor 54. Each slip ring 51 is provided on the axial rear end side of the rotary shaft 41. Each brush 52 is provided with its tip pressed to the surface of the slip ring 51. The brush 52 feeds power to the field winding 43 via the slip ring 51.

The regulator 53 is a device that regulates an output voltage of the rotary electrical machine 10 by controlling a field current flowing in the field winding 43. The regulator 53 includes a switching element 53*a* and a reflux diode 53*b*. In the present embodiment, the switching element 53*a* is connected in series with the field winding 43 and is a MOSFET. The reflux diode 53*b* is connected in parallel with the field winding 43. The capacitor 54 is connected in parallel with a serial connection body of the switching element 53*a* and the reflux diode 53*b*. Specifically, the cathode of the reflux diode 53*b* is connected to the first end of the capacitor 54, and the source of the switching element 53*a* is connected to the second end of the capacitor 54. When the switching element 53*a* is turned on, a closed circuit including the field winding 43 and the capacitor 54 is formed, and the electric power is supplied from the power source to the field winding 43. On the other hand, when the switching element 53*a* is turned off, the closed circuit is not formed, and a magnetic energy accumulated in the field winding 43 is released as a current through the reflux diode 53*b*.

The rectifier 60 is electrically connected to the armature winding 32 and is a device that rectifies an AC current output from the armature winding 32 into a DC current. In the present embodiment, the rectifier 60 is composed of a plurality of diodes which are rectifier elements.

The rotary electrical machine 10 includes a field current detector 70 for detecting a field current Ifr flowing through the field winding 43. In the present embodiment, the field current detector 70 is provided on the source side of the switching element 53*a*. The detection value of the field current detector 70 is input to a controller 55 included in the field supply part 50. The controller 55 turns on/off the switching element 53*a*. The controller 55 receives a phase current that is detected by a phase current detector and flows through the armature winding 32 and an electric angle θe of the rotary electrical machine 10 detected by an angle detector. Note that, the phase current detector and the angle detector may be included in the rotary electrical machine 10 or may be included in a system outside the rotary electrical machine 10.

In the rotary electrical machine 10 having the above configuration, when a rotational force is transmitted to the pulley 45 via a belt or the like, the rotor 40 rotates in a predetermined direction together with the rotary shaft 41. When an exciting voltage is applied from the brush 52 to the field winding 43 via the slip ring 51 in this state, the first and second claw-like magnetic pole parts 423*a* and 423*b* are excited, and the N magnetic poles and S magnetic poles are alternately formed in the circumferential direction of the rotor 40. Thereby, a rotating magnetic field is applied to the armature winding 32, and an AC current flows from the armature winding 32 to the rectifier 60. The AC current is converted into a DC current by the rectifier 60. The converted DC current is supplied to the field winding 43 as a power generation current Ig or supplied to an external power supply target 80 via an output terminal TB of the rotary electrical machine 10. The power supply target 80 includes a battery.

Figure 5:
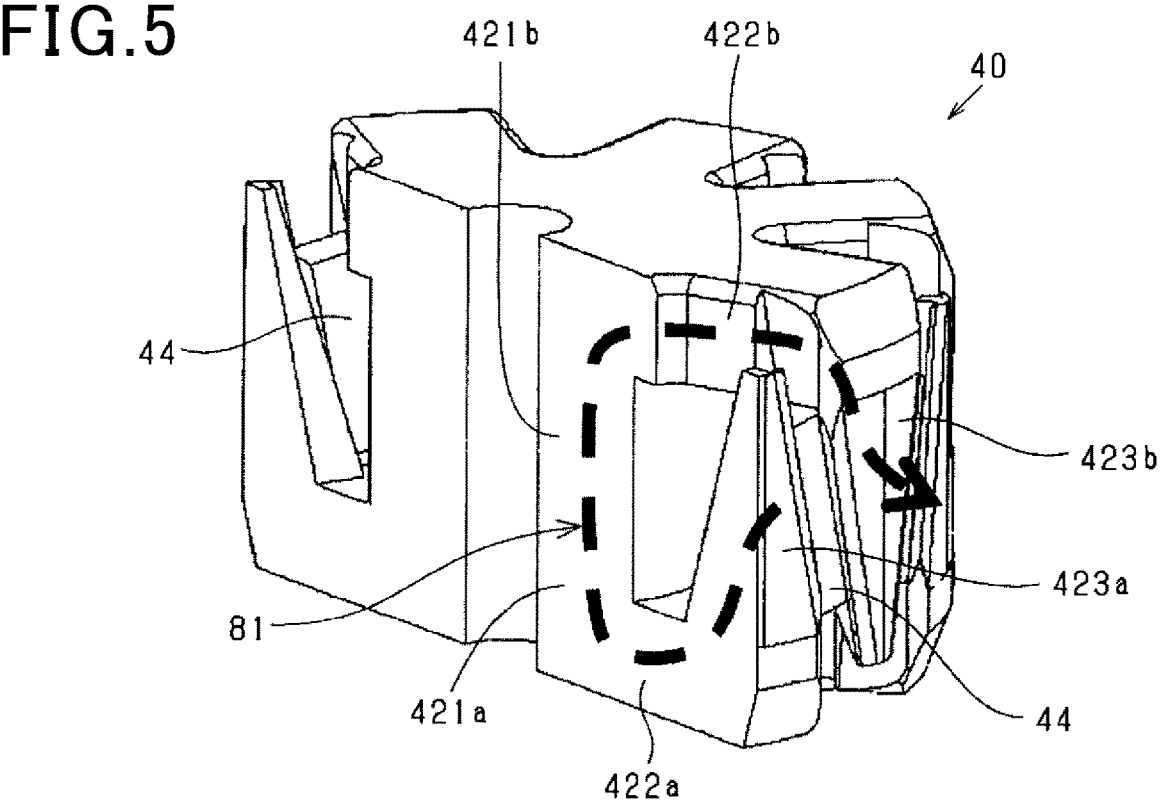
FIG. 5 is a diagram showing an outline of the d-axis magnetic circuit.

Subsequently, a magnetic circuit of the rotary electrical machine 10 will be described with reference to FIGS. 4, 5, and 8.

When the field current flows through the field winding 43, a field magnetic flux passing through the first and second boss parts 421*a* and 421*b* and one pair of the first and second claw-like magnetic pole parts 423*a* and 423*b* is formed. A d-axis magnetic circuit 81 is formed by this field magnetic flux. The d-axis magnetic circuit 81 is, as indicated with an arrow of a broken line in FIG. 4, a magnetic circuit in which the magnetic flux enters the first claw-like magnetic pole part 423*a* from the d-axis teeth 34 of the stator core 31 and returns to the d-axis teeth 34 at a position shifted by one magnetic pole of the stator core 31 via the first disk part 422*a*, the first boss part 421*a*, the second boss part 421*b*, the second disk part 422*b*, and the second claw-like magnetic pole part 423*b*, and then returns again to the d-axis teeth 34 at a position shifted by one magnetic pole through the yoke 33. The d-axis magnetic circuit 81 is a magnetic circuit that generates an inverse electromotive force in the rotor 40.

Figure 6:
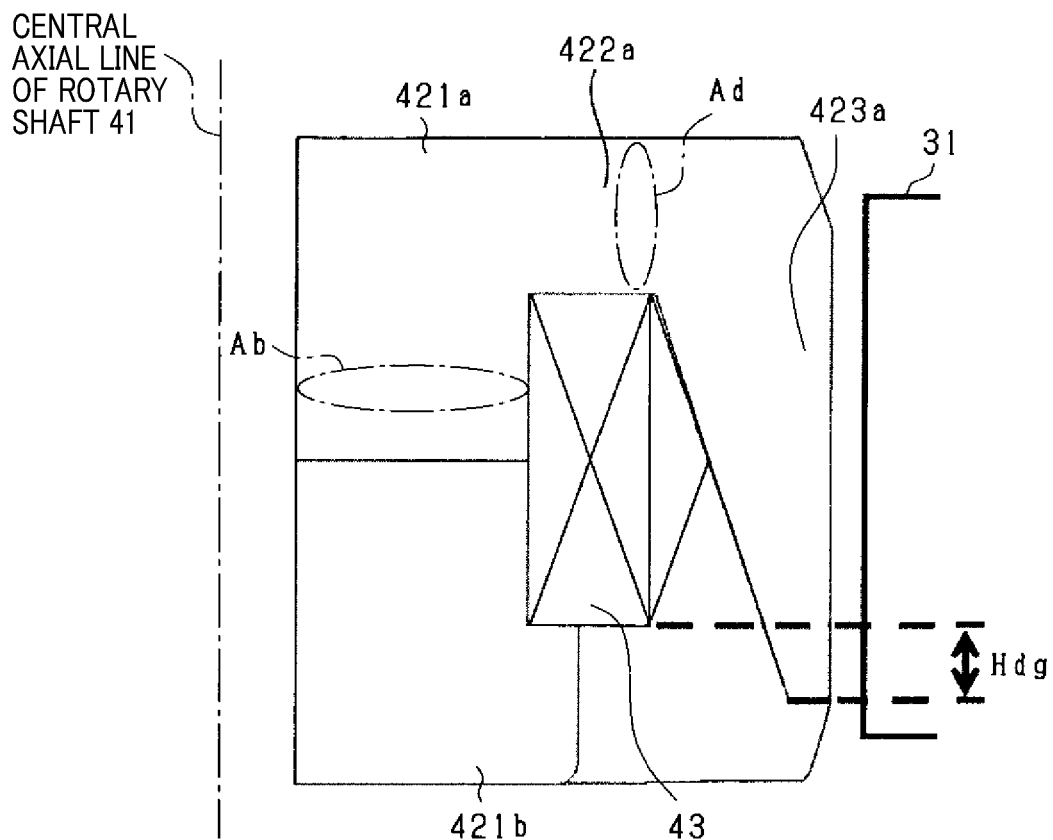
FIG. 6 is a partial sectional diagram of the rotor.
Figure 7:
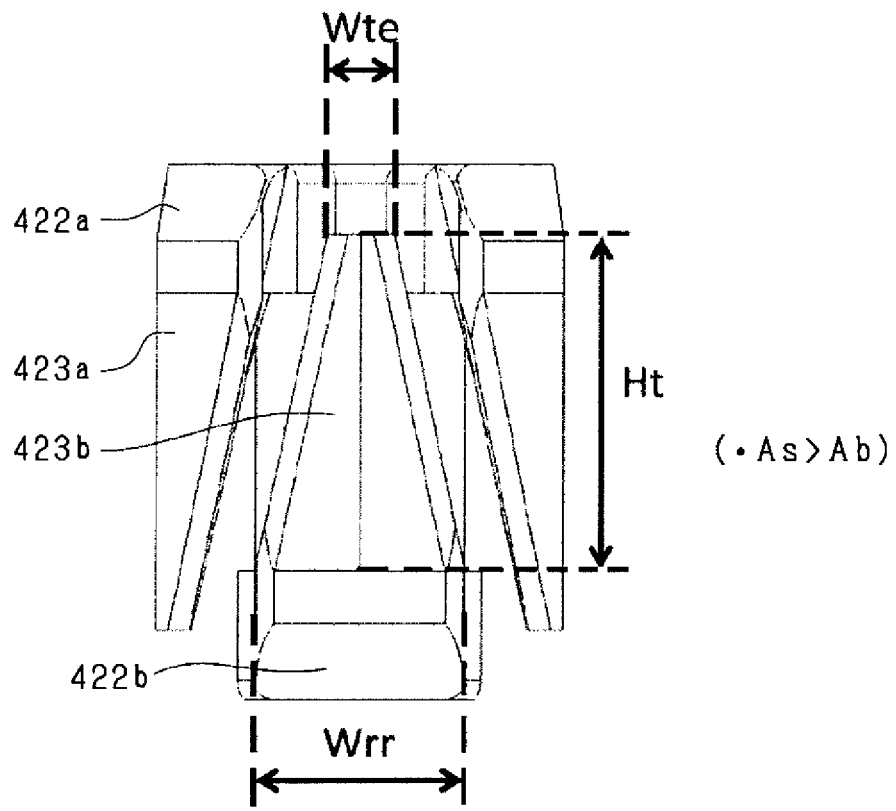
FIG. 7 is a diagram for explaining a surface area of a surface opposite to a stator in the rotor.

As shown in FIG. 6, a value obtained by dividing the sectional area of the boss part 421*a*, 421*b* when the boss part 421*a*, 421*b* is seen in the axial direction by the number of pole pairs Pn (Pn=8) of the rotary electrical machine 10 is Ab, and the sectional area of the disk part 422*a*, 422*b* is Ad. As shown in FIG. 4, the sectional area of the yoke 33 is Acb, and the sectional area of the teeth 34 per magnetic pole is At. The teeth 34 per magnetic pole are teeth 34 facing one claw-like magnetic pole part, and in the present embodiment, the number of teeth 34 per magnetic pole is three. In this case, as shown in FIG. 7, when the smaller one of Ab and Ad is Art, and the smaller one of Acb and At is Ast, Art>Ast is established. That is, in the d-axis magnetic circuit 81, the magnetic path sectional area in the magnetic circuit on the rotor 40 side is made smaller than the magnetic path sectional area in the magnetic circuit on the stator 30 side. According to this configuration, when the magnetic circuit passing through the q-axis shifted by 90° in the electric angle from the d-axis is a q-axis magnetic circuit 82 (refer to FIG. 4), a permeance Pst of the q-axis magnetic circuit 82 can be made larger than a permeance Prt of the d-axis magnetic circuit 81.

Figure 8:
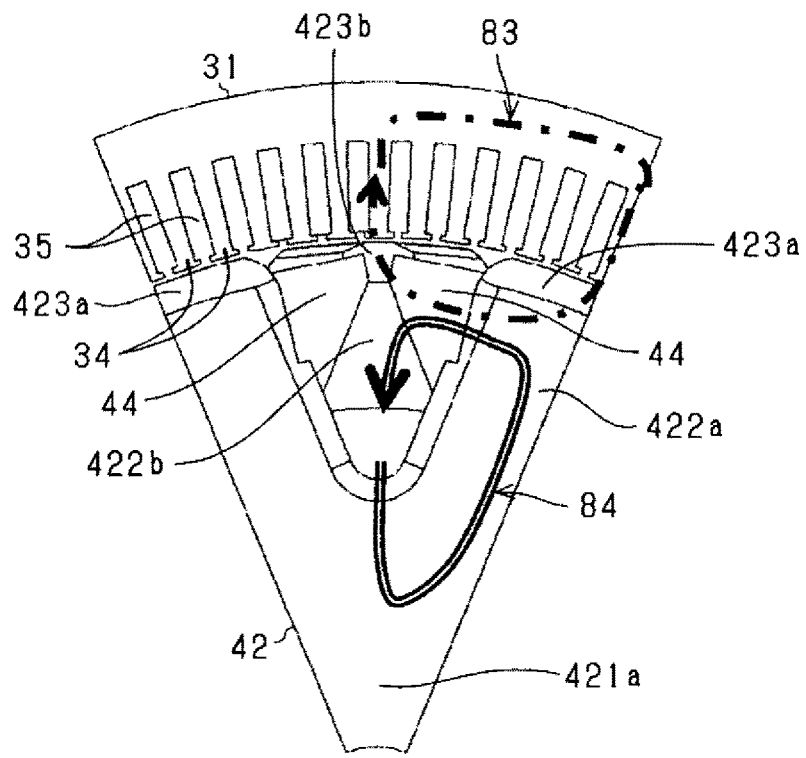
FIG. 8 is a diagram showing an outline of a magnet magnetic circuit.

The permanent magnet 44 arranged between the first and second claw-like magnetic pole parts 423*a* and 423*b* adjacent to each other in the circumferential direction forms, as shown in FIG. 8, a first magnet magnetic circuit 83 and a second magnet magnetic circuit 84. The first magnet magnetic circuit 83 is a magnetic circuit through which of the magnet magnetic fluxes a magnetic flux crossing the stator 30 flows. The second magnet magnetic circuit 84 is a magnetic circuit in which of the magnet magnetic fluxes a magnetic flux passes through the boss part 421*a*, 421*b* and the disk part 422*a*, 422*b* and flow of the magnetic flux completes in the rotor 40.

The first magnet magnetic circuit 83 and the d-axis magnetic circuit 81 share the magnetic circuit that starts from the second claw-like magnetic pole part 423*b* and returns to the first claw-like magnetic pole part 423*a* via the stator 30. In addition, the second magnet magnetic circuit 84 and the d-axis magnetic circuit 81 share the magnetic circuit in the boss parts 421*a* and 421*b* and the disk parts 422*a* and 422*b*. Since the magnet magnetic flux flowing through the second magnet magnetic circuit 84 flows in a direction opposite to that of the magnetic flux flowing through the d-axis magnetic circuit 81, the magnetic resistance is large, and the magnetic flux flow is impeded. Thereby, of the first and second magnet magnetic circuits 83 and 84, a magnet magnetic flux of the magnet magnetic circuit through which the magnetic flux crossing the stator 30 flows increases. As a result, the magnet magnetic flux can be used effectively, and electric power generation of the rotary electrical machine 10 can be substantially improved.

In the present embodiment, a surface area As of the surface opposite to the stator 30 in the rotor 40 is made larger than a value Ab obtained by dividing the sectional area of the boss part 421a, 421b when the boss part 421a, 421b as seen in its axial direction by the number of pole pairs. Thereby, the permeance from the magnetic pole on the rotor 40 side to the stator 30 side can be increased, and a diamagnetic field acting on the permanent magnet 44 can be reduced. For this reason, an increasing effect of the magnetic fluxes by the permanent magnet 44 can be brought about more effectively, which contributes to improvement of electric power generation by the rotary electrical machine 10.

Note that, in the present embodiment, the surface area As is defined as a surface area of the outer circumferential surface of the claw-like magnetic pole part 423a, 423b. As shown in FIG. 7, the width dimension of a root portion of the claw-like magnetic pole part 423a, 423b in the circumferential direction of the rotor 40 or the disk part 422a, 422b is Wrr, and the width dimension of the tip portion of the claw-like magnetic pole part 423a, 423b in the circumferential direction of the rotor 40 is Wte. In addition, the height dimension of the claw-like magnetic pole part 423a, 423b in the axial direction is Ht. As shown in FIG. 6, a surface facing the stator 30 in the radial direction in the disk part 422a, 422b is referred to as a disk guide. The length dimension of the disk guide in the axial direction of the rotor 40 is Hdg. In this case, the surface area As is calculated by "As=(Wte+Wrr)×Ht/2+Hdg×Wrr". Note that, in the present embodiment, the width dimension Wrr, Wte in the circumferential direction is measured by a direct distance without taking a curvature into consideration. In addition, a notch portion, an R portion, and a chamfered portion provided at the disk part 422a, 422b, the claw-like magnetic pole part 423a, 423b, and the stator core 31 for the purpose of magnet insertion or reinforcement do not greatly influence the calculation of the surface area As.

In the present embodiment, the amount of ampere-turns Ir of the field winding 43 at which magnetic saturation of the field core 42 occurs is made lower than the amount of ampere-turns Is of the armature winding 32 at which magnetic saturation of the stator core 31 occurs. Thereby, an increasing effect of the magnetic fluxes by the permanent magnet 44 can be brought about more properly. In addition, a saturated magnetic flux quantity Φr of the field core 42 is made smaller than a saturated magnetic flux quantity Φs of the stator core 31. Thereby, the magnetic fluxes produced by the permanent magnet 44 can be increased even more.

Figure 10:
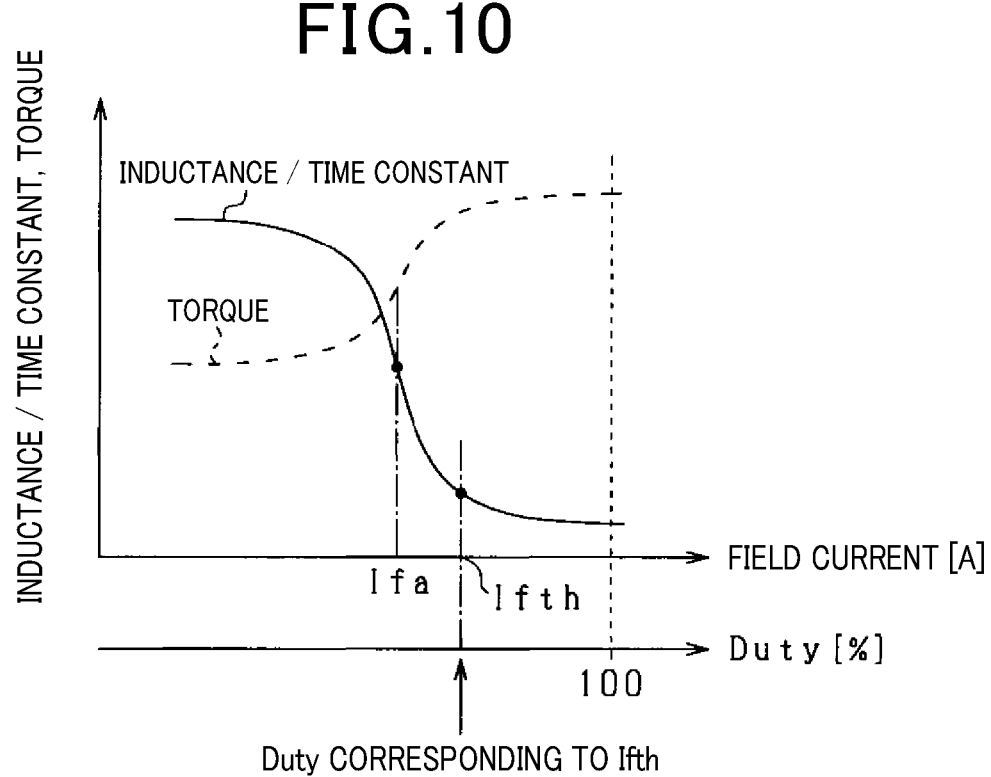
FIG. 10 is a characteristic diagram showing relations of an inductance, a time constant, and a torque with respect to a field current and a duty ratio.

Incidentally, in the rotary electrical machine 10 in which the permeance Pst of the q-axis magnetic circuit 82 is made larger than the permeance Prt of the d-axis magnetic circuit 81, as shown in FIG. 10, when the field current is increased, the inductance of the field winding 43 sharply decreases before the torque of the rotary electrical machine 10 reaches its maximum value. Specifically, the inductance decreases at a level that changes by an order of magnitude. Generally, when a permeability of a material of the magnetic circuit is $\mu$, a magnetic path sectional area is A, and a magnetic path length is sL, a permeance P of the magnetic circuit is expressed by "P=$\mu$×A/sL". In addition, when the number of turns of the field winding 43 is Nf, an inductance Lrt of the field winding 43 is expressed by "Lrt=Prt×N^2". The permeability $\mu$ changes according to the degree of magnetic saturation of the magnetic circuit, and its magnitude is about several thousands to 10,000 times the permeability of air in a state before saturation. However, in a state of oversaturation in which saturation has further advanced, it decreases to about several times the permeability of air. When the inductance of the field winding 43 is Lrt, and a resistance of the field winding 43 is Rrt, a time constant $\tau$ of a general electric circuit including the field winding 43 is expressed by Lrt/Rrt. In the present embodiment, although the resistance Rrt of the field winding 43 does not change greatly according to a load state of the rotary electrical machine 10, when the inductance Lrt changes at a level that changes by an order of magnitude, the time constant $\tau$ sharply changes. As a result, the ripple of the field current is increased, and the control of the field current becomes unstable. This may cause large fluctuation in the generated voltage output from the output terminal TB of the rotary electrical machine 10.

Figure 11:
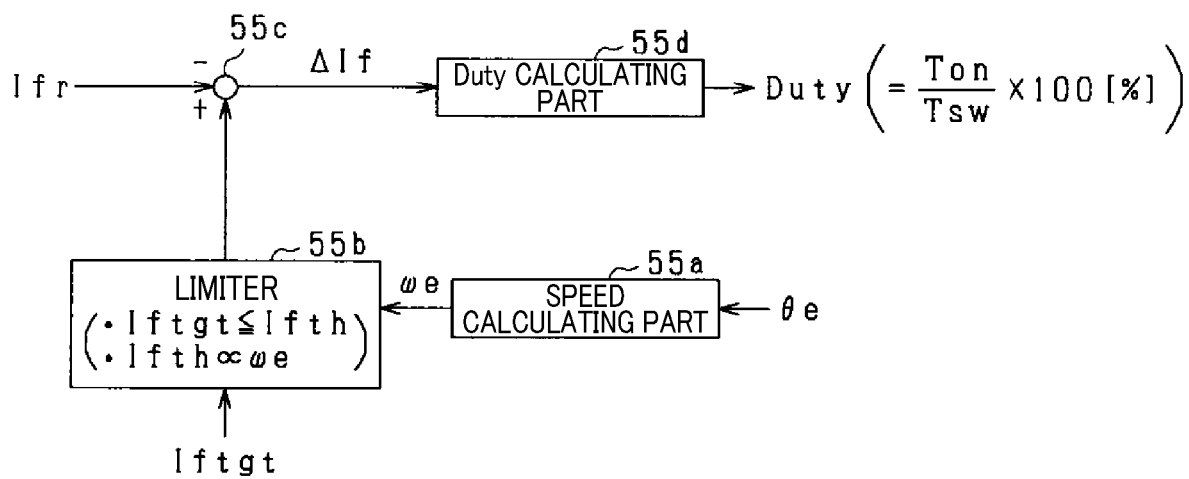
FIG. 11 is a block diagram showing processing performed by a controller.

Thus, in the present embodiment, the controller 55 performs processing shown in FIG. 11. FIG. 11 shows a block diagram of control processing of the field current.

A speed calculating part 55a calculates an electric angular velocity ωe of the rotor 40 based on the detected electric angle θe.

A limiter 55b limits a field command current Iftgt input from the outside by a field threshold Ifth. Specifically, when the input field command current Iftgt is equal to or less than the field threshold Ifth, the limiter 55b outputs the input field command current Iftgt as it is. On the other hand, when the input field command current Iftgt exceeds the field threshold Ifth, the limiter 55b outputs the field command current Iftgt having the same value as the field threshold Ifth. Note that, the field command current Iftgt is set large, for example, when it is desired to increase a charge current of a battery included in the power supply target 80.

A deviation calculating part 55c calculates a current deviation ΔIf by subtracting the field current Ifr detected by the field current detector 70 from the field command current Iftgt output from the limiter 55b.

A duty calculating part 55d, based on the current deviation ΔIf, calculates a duty ratio Duty that is an operation amount for feedback-controlling the field current Ifr to the field command current Iftgt. The duty ratio Duty is a ratio of an on-time Ton to one switching cycle Tsw of the switching element 53a. The switching element 53a is operated based on the duty ratio Duty calculated by the duty calculating part 55d.

The field threshold Ifth in the limiter 55b is, as shown in FIG. 10, a value larger than a field current Ifa that gives the maximum reduction amount of the inductance of the field winding 43 with respect to an increasing amount of the field current in a range that the field current can take during driving the rotary electrical machine 10. The field threshold Ifth is a field current immediately before the inductance of the field winding 43 saturates. In the present embodiment, the saturation of the inductance means a state in which the inductance does not substantially change even if the field current increases. Since the field command current Iftgt is limited by the field threshold Ifth in the limiter 55b, the duty ratio Duty calculated by the duty calculating part 55d is set to a value that is larger than the duty ratio Duty corresponding to the maximum field current Ifa and less than 100%. Note that, the duty ratio Duty corresponding to the field threshold Ifth corresponds to the predetermined value.

The limiter 55b sets the field threshold Ifth larger as the electric angular velocity ωe calculated by the speed calculating part 55a is higher. In the following, the reason for setting it like this will be described.

When an impedance of the armature winding 32 is Z, a counter electromotive voltage generated at the armature winding 32 is Ve, and an applied voltage to the armature winding 32 is Vb, a current (regenerative current 1) flowing through the armature winding 32 of the rotary electrical machine 10 can be can be approximately expressed by the following equation (eq1). In the present embodiment, the applied voltage Vb to the armature winding 32 is an applied voltage from the battery included in the power supply target 80.

$$I=(Ve-Vb)/Z \quad (eq1)$$

According to the above equation (eq1), it is conceivable to reduce the impedance Z in order to increase the regenerative current 1. When a resistance is R, a frequency is f, and an impedance is L, since the relation "$Z=\sqrt{R^2+2\pi f \times L}$" is established, the rotary electrical machine 10 with the small inductance has a small impedance. For this reason, it can be understood that making the inductance of the field winding 43 small is one of methods for increasing the regenerative current 1. However, the controllability of the field current deteriorates with reduction in inductance.

Figure 12:
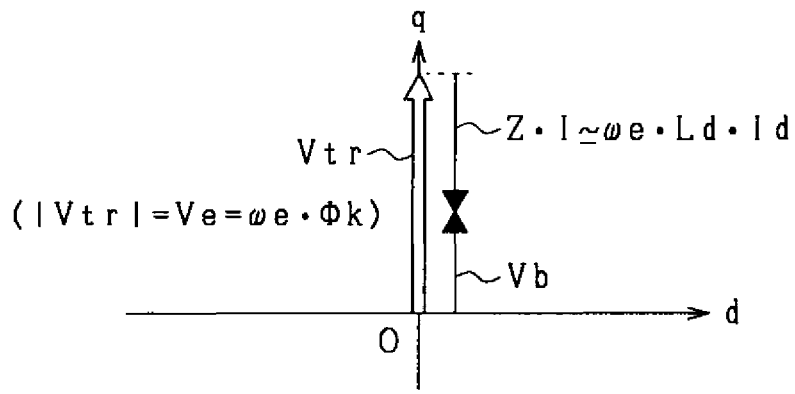
FIG. 12 is a diagram showing a voltage vector in a d-q coordinate system.

Here, while the field current acts in a direction of promoting magnetic saturation of the rotor 40, the regenerative current 1 generates armature reaction and acts in a direction of relieving magnetic saturation of the rotor 40. In the present embodiment, as shown in FIG. 12, on a q-axis of the d-q coordinate system with the origin as O, a voltage vector Vtr, a voltage vector Z×I corresponding to the armature reaction expressed by the following equation (eq2), and a voltage vector corresponding to the applied voltage Vb to the armature winding 32 appear. In FIG. 12, for convenience sake, the voltage vector Z×I corresponding to the armature reaction and the voltage vector corresponding to the applied voltage Vb to the armature winding 32 are shown at positions shifted from the q-axis. The voltage vector Vtr in the present embodiment corresponds, as shown in the following equation (eq3), to the counter electromotive voltage Ve. Note that, in the following equation (eq2), Ld indicates a d-axis inductance.

$$Z \times I \approx \omega e \times Ld \times Id \quad (eq2)$$

$$Ve = \omega e \times \Phi k \quad (eq3)$$

Φk in the above equation (eq3) indicates a magnetic flux quantity of a composite magnetic flux of the magnetic flux generated by flowing of current in the armature winding 32 and the field magnetic flux generated by flowing of the field current. The magnetic flux quantity Φk of the composite magnetic flux is expressed by the following equation (eq4). In the following equation (eq4), Φm indicates a magnetic flux quantity of the field magnetic flux generated by flowing of the field current.

$$\Phi k = \Phi m - Ld \times Id \quad (eq4)$$

From the above equation (eq4), the magnetic flux quantity Φk of the composite magnetic flux becomes smaller as the d-axis current Id becomes larger. In this case, there occurs a problem that as the d-axis current Id becomes larger, the power generation current of the rotary electrical machine 10 becomes smaller. Therefore, to cope with this problem, as the d-axis current Id becomes larger, the field current is made larger, and thus the magnetic flux quantity Φk of the composite magnetic flux is increased and eventually the power generation current is increased.

The field threshold Ifth is expressed by the following equation (eq5). In the following equation (eq5), Ns indicates the number of turns of the armature winding 32, Rd indicates a magnetic resistance of the rotor 40 in the d-axis magnetic circuit 81, and Φ indicates a saturated magnetic flux quantity of the rotor 40 in the d-axis magnetic circuit 81. When the magnetic path sectional area of the rotor 40 in the d-axis magnetic circuit 81 is Ad, and a saturated magnetic flux density of an iron core material of the rotor 40 is Bs, the saturated magnetic flux quantity Φ can be calculated by "Φ=Bs×Ad".

$$Ifth = (Ns \times Id + Rd \times \Phi)/Nf \quad (eq5)$$

The d-axis current Id that generates the armature reaction becomes large in proportion to the rotation speed (electric angular velocity ωe) of the rotor 40. For this reason, the field current is made larger as the electric angular velocity ωe becomes higher, and thereby the power generation current can be increased. In this case, the equation showing the relation between the field threshold Ifth and the electric angular velocity ωe can be derived from the above equation (eq5). For example, the equation showing the relation between the field threshold Ifth and the electric angular velocity ωe may use an equation obtained by substituting "Id=a×ωe" into the above equation (eq5), where a is a positive real number.

Figure 13:
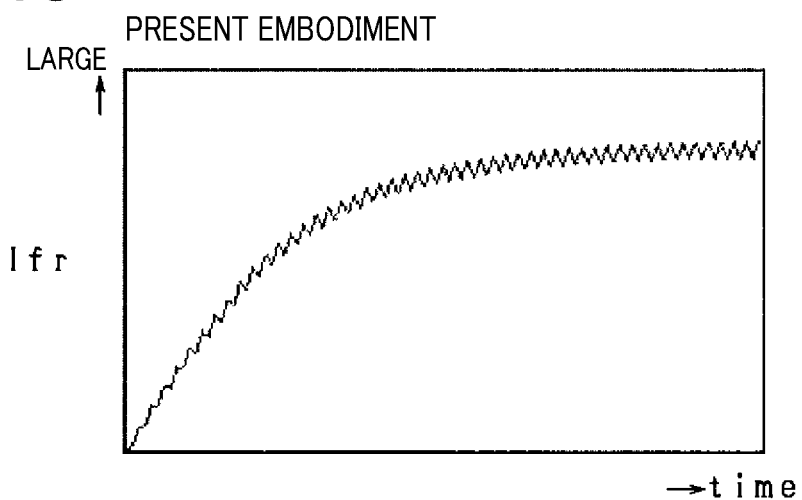
FIG. 13 is a time chart showing changes in the field current when a rotary electrical machine according to the first embodiment is started.
Figure 14:
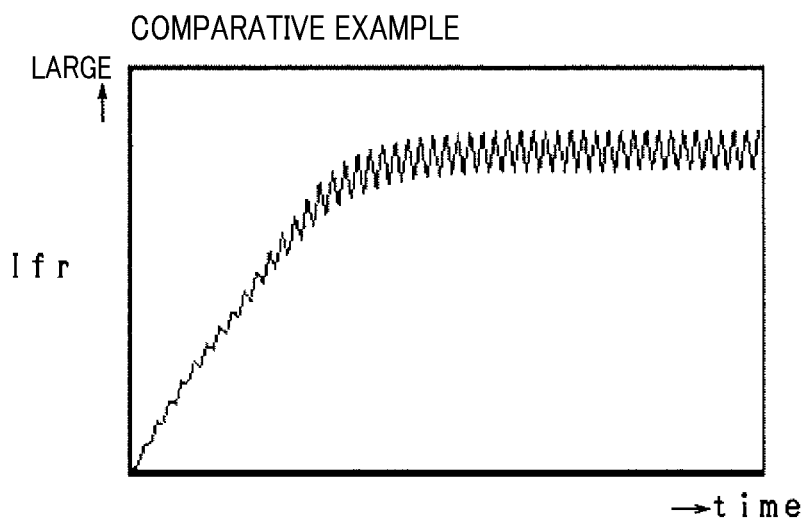
FIG. 14 is a time chart showing changes in the field current when a rotary electrical machine according to a comparative example is started.

According to the processing of FIG. 11 including the limiter 55b, as shown in FIG. 13, the ripple of the field current can be suppressed, and reduction in controllability of the field current can be suppressed. As a result, the generated voltage of the rotary electrical machine 10 can be stabilized. In contrast, in a comparative example in which the field current becomes larger than the field threshold Ifth, as shown in FIG. 14, the ripple of the field current increases, and the controllability of the field current is greatly lowered. Note that, FIG. 13 and FIG. 14 show changes of the field current during starting the rotary electrical machine 10 in which the inductance of the field winding 43 changes greatly and the controllability of the field current is easily lowered.

According to the present embodiment described above, it is possible to appropriately suppress reduction in the controllability of the field current and to stabilize the generated voltage of the rotary electrical machine 10.

Conventionally, since the power generation current of the rotary electrical machine 10 is required in an idling state of an engine in which the rotation speed of the rotor 40 is low, the field current is set larger as the rotation speed of the rotor 40 is lower. On the other hand, in the present embodiment, the permeance Pst of the q-axis magnetic circuit 82 is set larger than the permeance Prt of the d-axis magnetic circuit 81, and a configuration including the permanent magnet 44 is adopted. According to this configuration, a large power generation current can be obtained even during low-speed rotation of the rotor 40. Furthermore, in order to obtain even higher power generation current during high-speed rotation of the rotor 40, the field threshold Ifth is set higher as the electric angular velocity ωe is higher. While the field current acts in a direction of promoting magnetic saturation of the rotor 40, the d-axis current generates armature reaction and acts in a direction of relieving magnetic saturation of the rotor 40. For this reason, since the field threshold Ifth is set larger as the d-axis current is larger, it is possible to increase the power generation current of the rotary electrical machine 10 while suppressing reduction in the controllability of the field current. In addition, since the ripple of the field current can be suppressed, the switching frequency of the switching element 53a does not need to be set high. This makes it possible to suppress increase of switching loss and to suppress emission noise.

Second Embodiment

Figure 15:
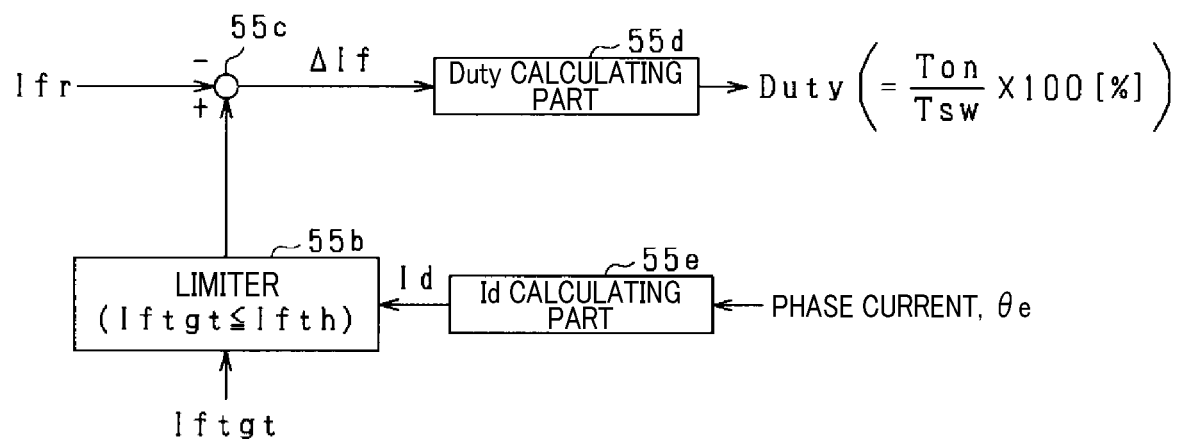
FIG. 15 is a block diagram showing processing performed by a controller according to a second embodiment.

Hereinafter, the second embodiment will be described with reference to drawings centering on the difference from the first embodiment. In the present embodiment, as shown in FIG. 15, the configuration of the controller 55 is changed. Note that, in FIG. 15, the same configuration as that shown in previous FIG. 11 is attached with the same code for convenience sake.

A d-axis current calculating part 55e calculates a d-axis current Id flowing through the armature winding 32 based on the detected phase current and electric angle θe.

Figure 16:
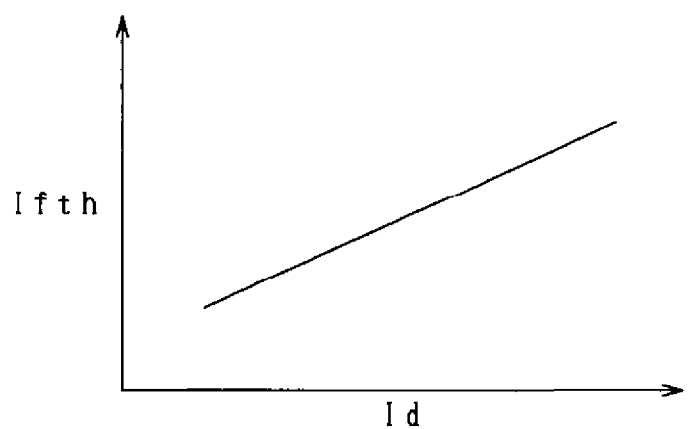
FIG. 16 is a diagram showing a relation between a d-axis current and a predetermined value.

The limiter 55b calculates the field threshold Ifth based on the d-axis current Id calculated by the d-axis current calculating part 55e and the above equation (eq5). The field threshold Ifth becomes, as shown in FIG. 16, larger as the d-axis current Id becomes larger.

According to the present embodiment described above, effects similar to the effects of the first embodiment can be obtained.

Third Embodiment

Figure 17:
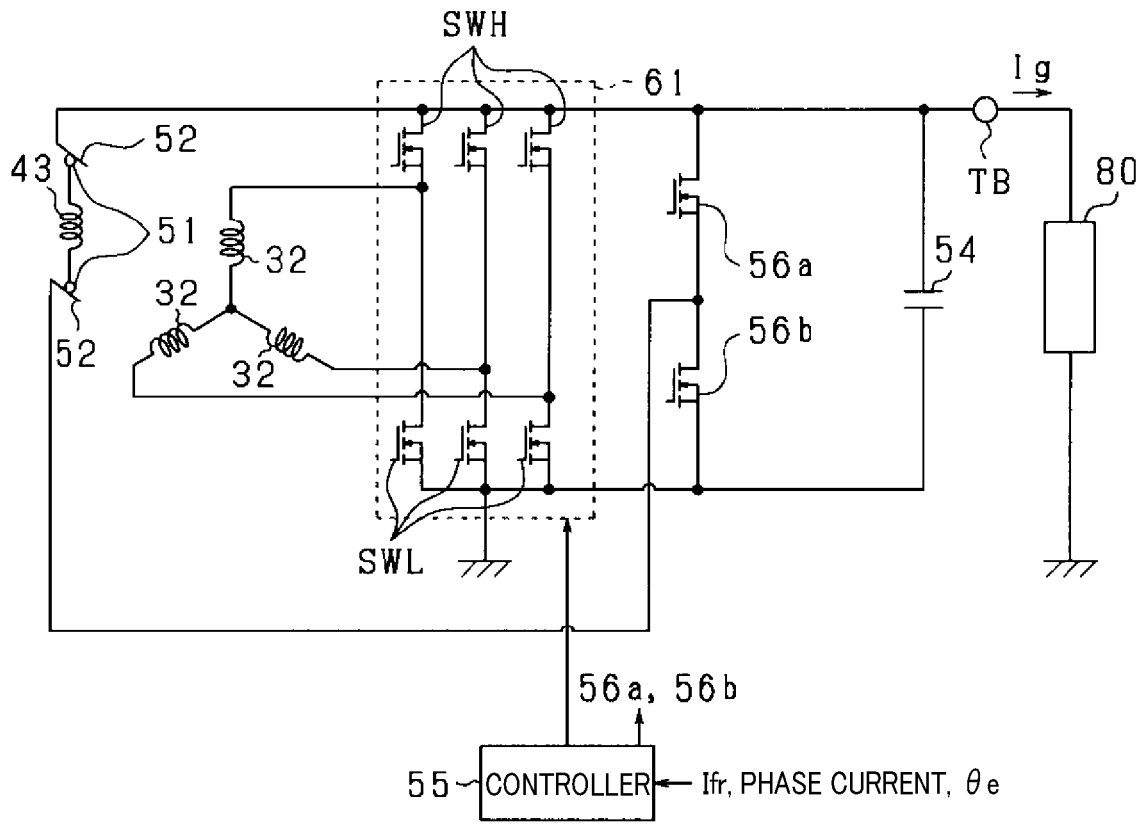
FIG. 17 is a diagram showing an electrical configuration of a rotary electrical machine according to a third embodiment.

Hereinafter, the third embodiment will be described with reference to drawings centering on the difference from the first embodiment. In the present embodiment, as shown in FIG. 17, the configuration of the field supply part 50 is changed. Note that, in FIG. 17, the same configuration as that shown in previous FIG. 9 is attached with the same code for convenience sake.

A rectifier 61 is configured as an inverter including upper and lower arm switching elements SWH, SWL for three phases and performs synchronous rectification. The synchronous rectification can reduce thermal loss. In the present embodiment, each switching element SWH, SWL is an MOSFET.

The field supply part 50 includes first and second switching elements 56a and 56b. In the present embodiment, each of the first and second switching elements 56a and 56b is an MOSFET. The drain of the first switching element 56a is connected to the drain of the upper arm switching element SWH of the rectifier 61, and the drain of the second switching element 56b is connected to the source of the first switching element 56a. The source of the lower arm switching element SWL is connected to the source of the second switching element 56b. The capacitor 54 is connected in parallel to a serial connection body of the first and second switching elements 56a and 56b. Note that, the first switching element 56a may be the one composed of a first MOSFET having a source connected to the drain of the second switching element 56b and a second MOSFET having a source connected to the drain of the first MOSFET.

To the drain of the first switching element 56a, the first end of the field winding 43 is connected via the brush 52 and the slip ring 51. To the second end of the field winding 43, the connection point of the first and second switching elements 56a and 56b is connected via the slip ring 51 and the brush 52.

The controller 55 turns on/off the upper and lower arm switching elements SWH and SWL in order to perform synchronous rectification and control a current phase β to be described below. In addition, the controller 55 turns on/off the first and second switching elements 56a and 56b. When the first switching element 56a is turned off and the second switching element 56b is turned on, a closed circuit including the capacitor 54, the field winding 43, and the second switching element 56b is formed, and electric power is supplied from the capacitor 54 to the field winding 43. On the other hand, when the first switching element 56a is turned on and the second switching element 56b is turned off, a closed circuit including the capacitor 54, the field winding 43, and the second switching element 56b is not formed, and electric power is not supplied from the capacitor 54 to the field winding 43. Note that, in the present embodiment, the duty ratio Duty is a ratio of the on-time Ton to the first switching cycle Tsw of the second switching element 56b.

Note that, the switching frequency of the first and second switching elements 56a and 56b is made smaller than the switching frequency of the switching elements SWH and SWL forming the rectifier 61. This makes it possible to suppress electromagnetic interference to the rectifier 61 due to the switching operation of the first and second switching elements 56a and 56b and to reduce the switching loss of the first and second switching elements 56a and 56b. By reducing the switching loss, it is possible to reduce thermal burden from the first and second switching elements 56a and 56b to the rectifier 61.

The controller 55 further controls each switching element SWH, SWL of the rectifier 61 as the inverter so that the field current is larger than the d-axis current. This will be described in the following.

Figure 18:
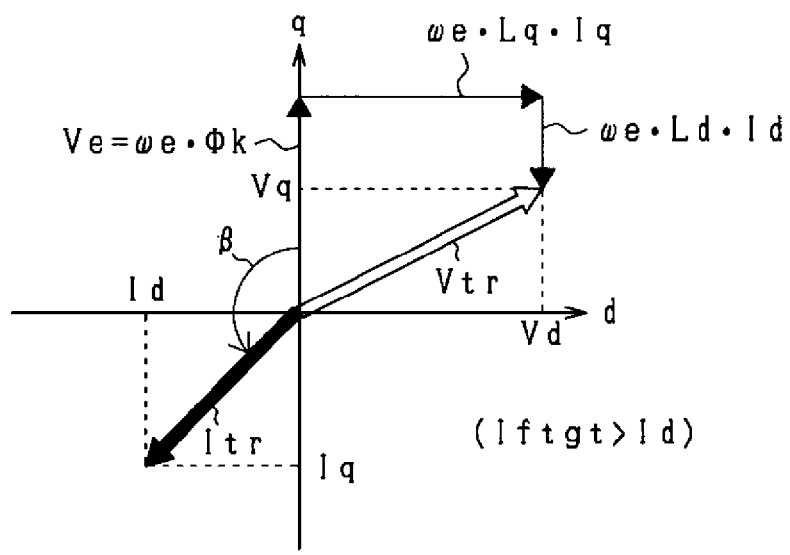
FIG. 18 is a diagram showing a voltage vector and a current vector in a d-q coordinate system.

FIG. 18 shows a voltage vector Vtr and a current vector Itr in the d-q coordinate system of the present embodiment. The magnetic flux quantity Φm of the field magnetic flux generated by flowing of the field current If is expressed by the following equation (eq6). A q-axis voltage Vq which is a q-axis component of the voltage vector Vtr is expressed by the following equation (eq7).

$$\Phi m \cong Lrt \times If \tag{eq6}$$

$$Vq = \omega e \times \Phi m - \omega e \times Ld \times Id \tag{eq7}$$

In the present embodiment, "Ld≅Lrt" is established, and thus the following equation (eq8) is derived from the above equations (eq6) and (eq7).

$$Vq \cong \omega e \times Lrt(If - Id) \tag{eq8}$$

When attention is paid to the right side of the above equation (eq8), it can be understood that the rotary electrical machine 10 cannot generate an electric power unless "If−Id>0" holds. For this reason, in the present embodiment, the controller 55 sets the field command current Iftgt larger than the calculated d-axis current Id. Therefore, the controller 55 sets the field command current Iftgt larger as the calculated d-axis current Id becomes larger.

According to the rectifier 61 as an inverter, the current phase β, which is a phase of the current vector Itr flowing through the armature winding 32, can be controlled. That the current phase β can be controlled means that the d-axis current Id can be controlled. According to the configuration in which the d-axis current Id is adjusted by the control of the current phase β, it is possible to more accurately adjust a voltage "ωe×Ld×Id" that generates the armature reaction. This makes it possible to more appropriately suppress reduction in the controllability of the field current and to more appropriately stabilize the generated voltage of the rotary electrical machine 10. Note that, the configuration of the present embodiment can be applied not only in a case where the rotary electrical machine 10 is used as a power generator but also in a case where the rotary electrical machine 10 is used as an electric motor.

Other Embodiments

Note that, the above-described each embodiment may be modified as described below and carried out.

Since the magnetic path sectional area of one part of the field core 42 is made smaller than the magnetic path sectional area of the other part, the permeance Pst of the q-axis magnetic circuit 82 may be made larger than the permeance Prt of the d-axis magnetic circuit 81. In this case, since the permeance design can be realized by the shape of the field core 42, the design and processing of the field core 42 can be easily realized. In the following, the configuration in which the magnetic path sectional area of one part of the field core 42 is made smaller than the magnetic path sectional area of the other part will be described with the first pole core 42a as an example.

Figure 19:
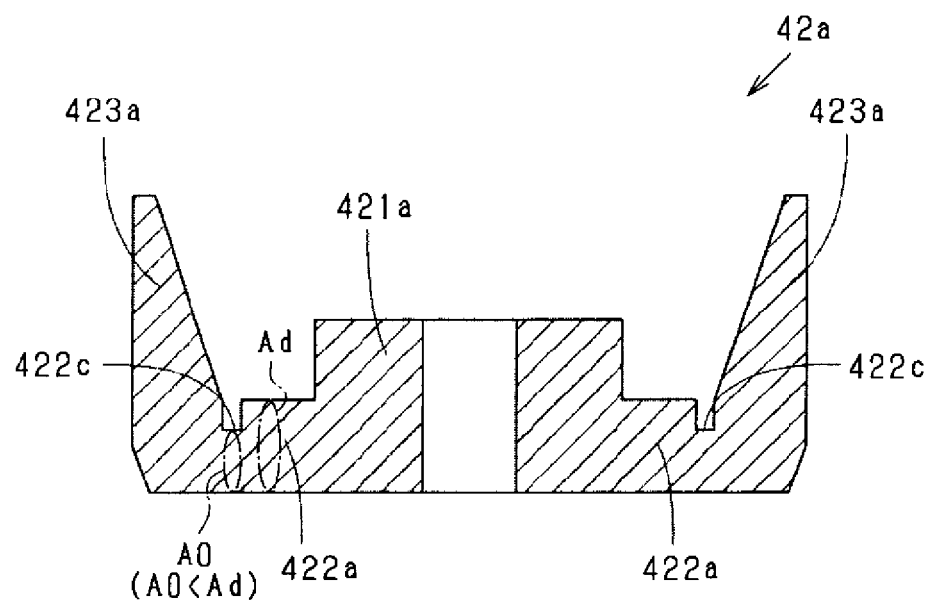
FIG. 19 is a sectional diagram of a field core according to another embodiment.

As shown in FIG. 19, an annular groove portion 422c extending in the circumferential direction of the rotor 40 may be formed in the first disk part 422a. In this case, in the first disk part 422a, a sectional area Ad of a portion where the groove portion 422c is not formed is larger than a sectional area AO of a portion where the groove portion 422c is formed.

Figure 20:
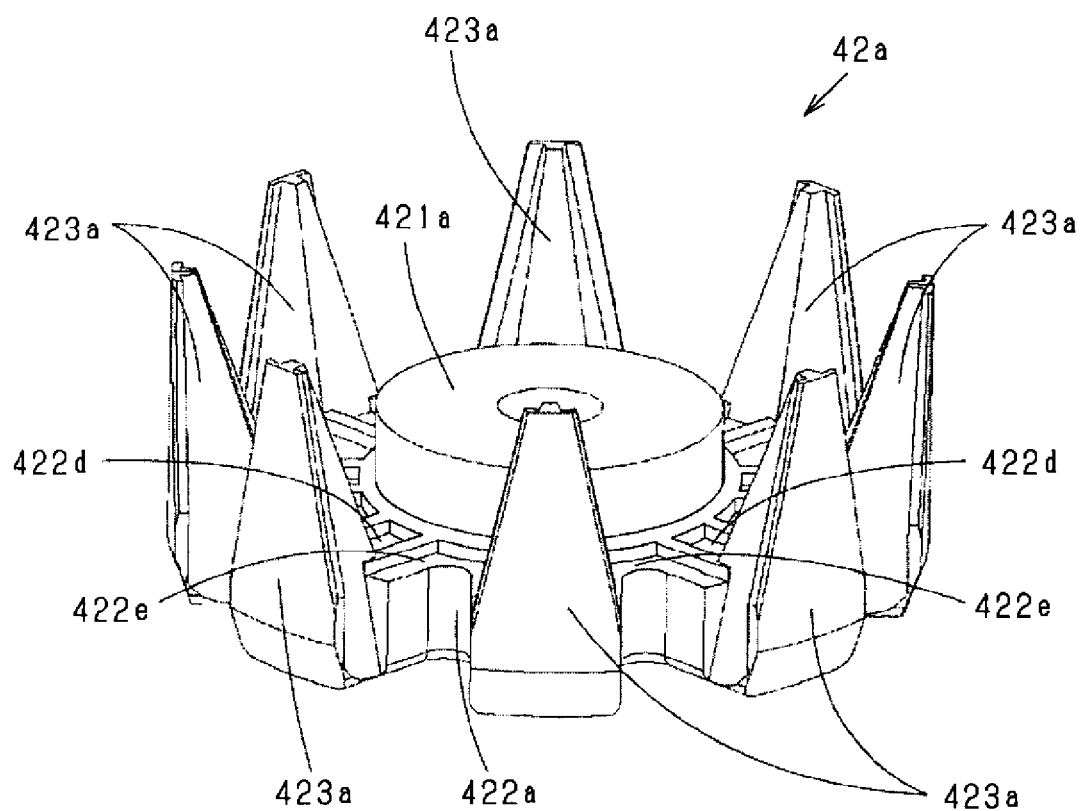
FIG. 20 is a perspective view of a field core according to another embodiment.

As shown in FIG. 20, a central recessed portion 422d extending in a radial direction of the rotor 40 may be formed in the first disk part 422a, and a recessed portion 422e extending in the circumferential direction may be formed between the first disk parts 422a adjacent to each other in the circumferential direction of the rotor 40.

Figure 21:
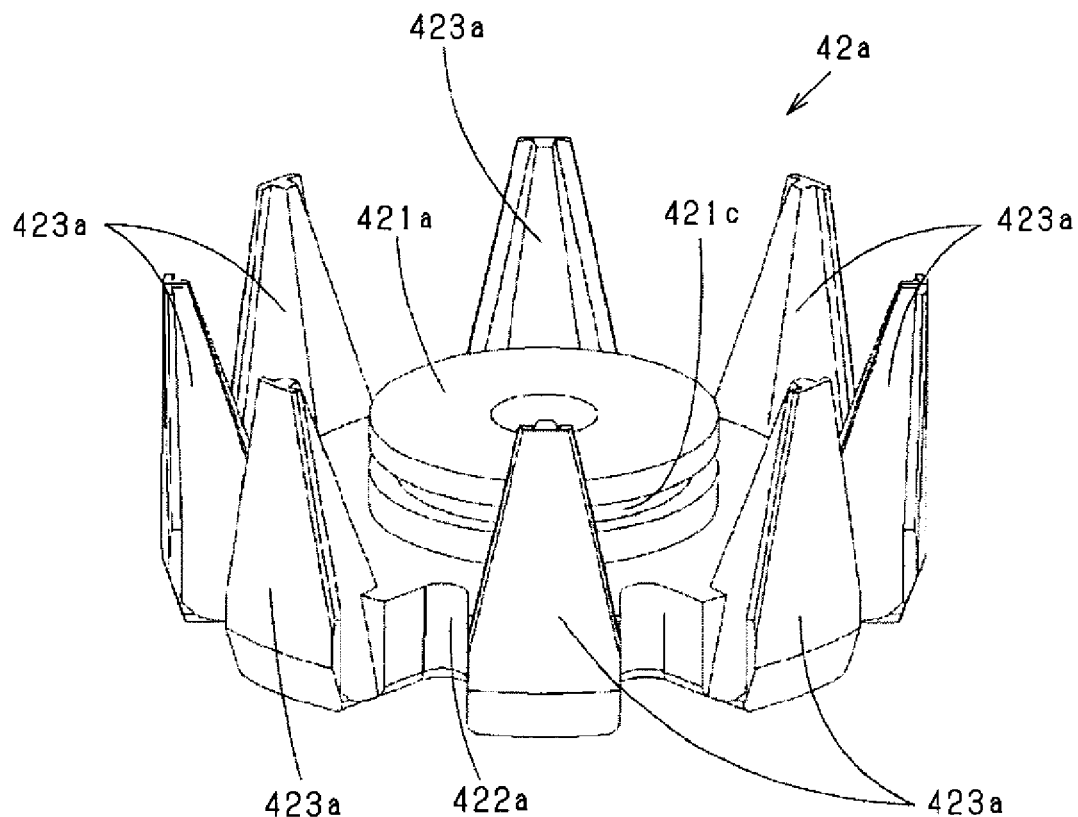
FIG. 21 is a perspective view of a field core according to another embodiment.

As shown in FIG. 21, a groove portion 421c may be formed in the first boss part 421a along its circumferential direction.

Figure 22:
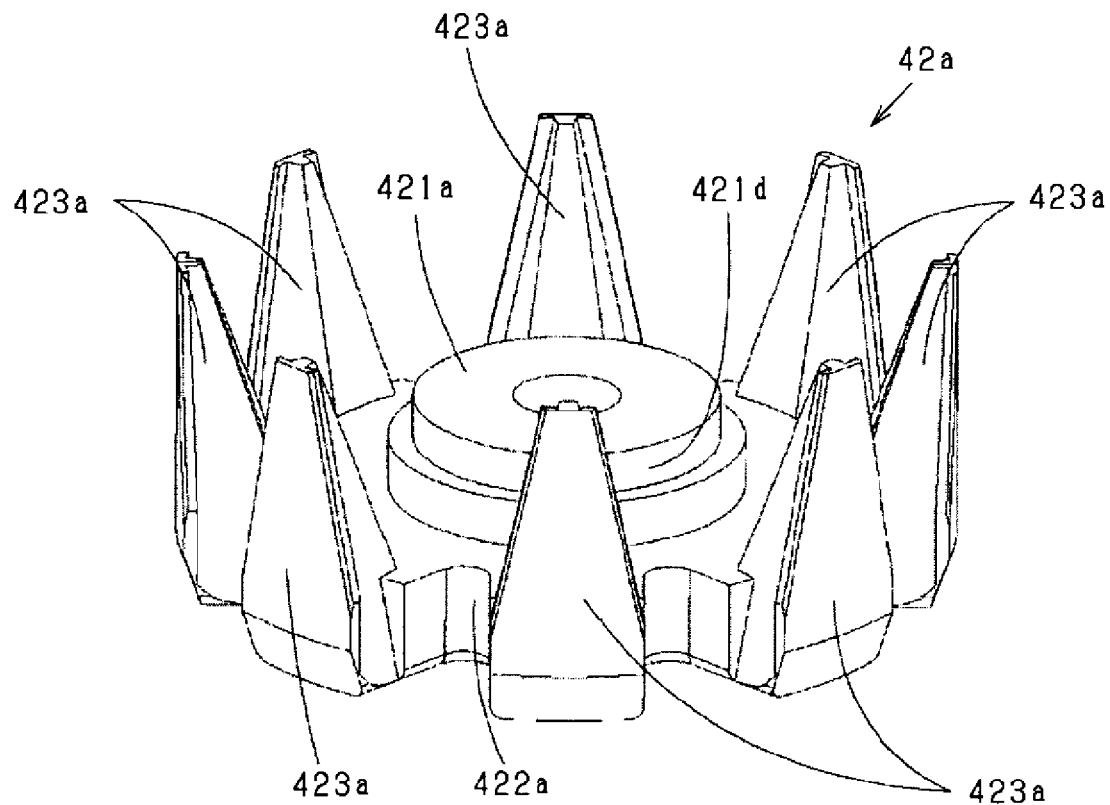
FIG. 22 is a perspective view of a field core according to another embodiment.

As shown in FIG. 22, a part 421d in which the outer diameter on the tip side of the first boss part 421a is made smaller than the outer diameter on the root side may be formed.

Figure 23:
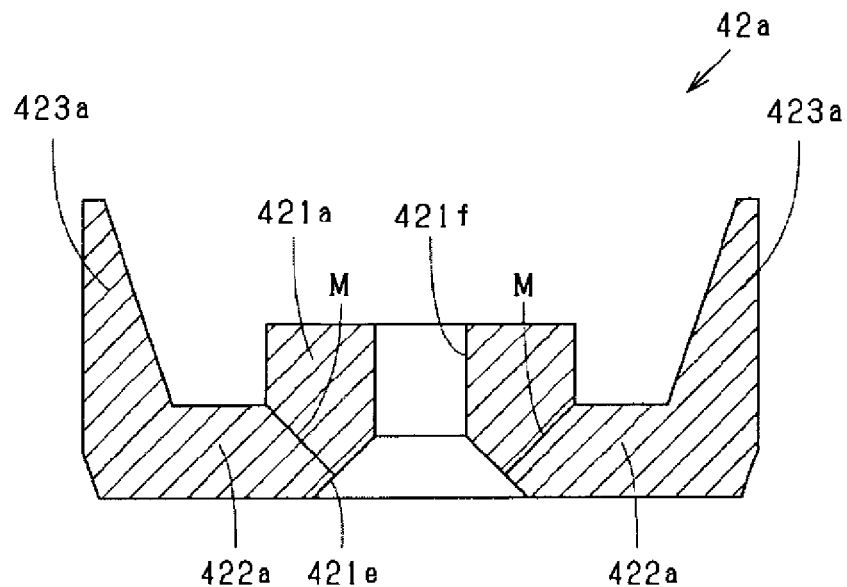
FIG. 23 is a sectional diagram of a field core according to another embodiment.

As shown in FIG. 23, a taper part 421e communicating with a hole part 421f into which the rotary shaft 41 is inserted may be formed on the first disk part 422a side in the first boss part 421a. In this case, the first pole core 42a may be composed of two members. FIG. 23 shows a boundary M at which two members contact with each other.

Figure 24:
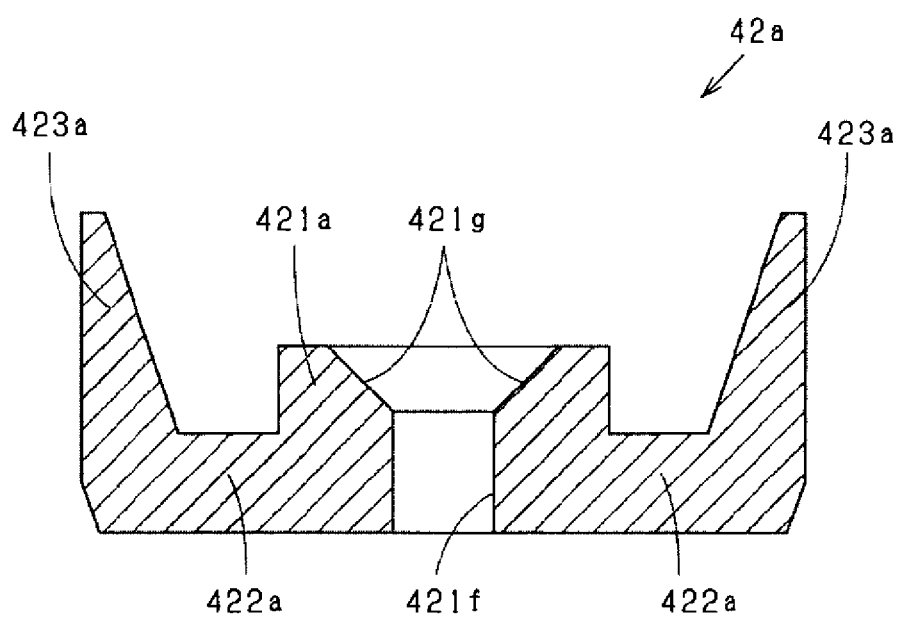
FIG. 24 is a sectional diagram of a field core according to another embodiment.

As shown in FIG. 24, a taper part 421g communicating with the hole part 421f into which the rotary shaft 41 is inserted may be formed on the opposite side of the first disk part 422a in the first boss part 421a.

Figure 25:
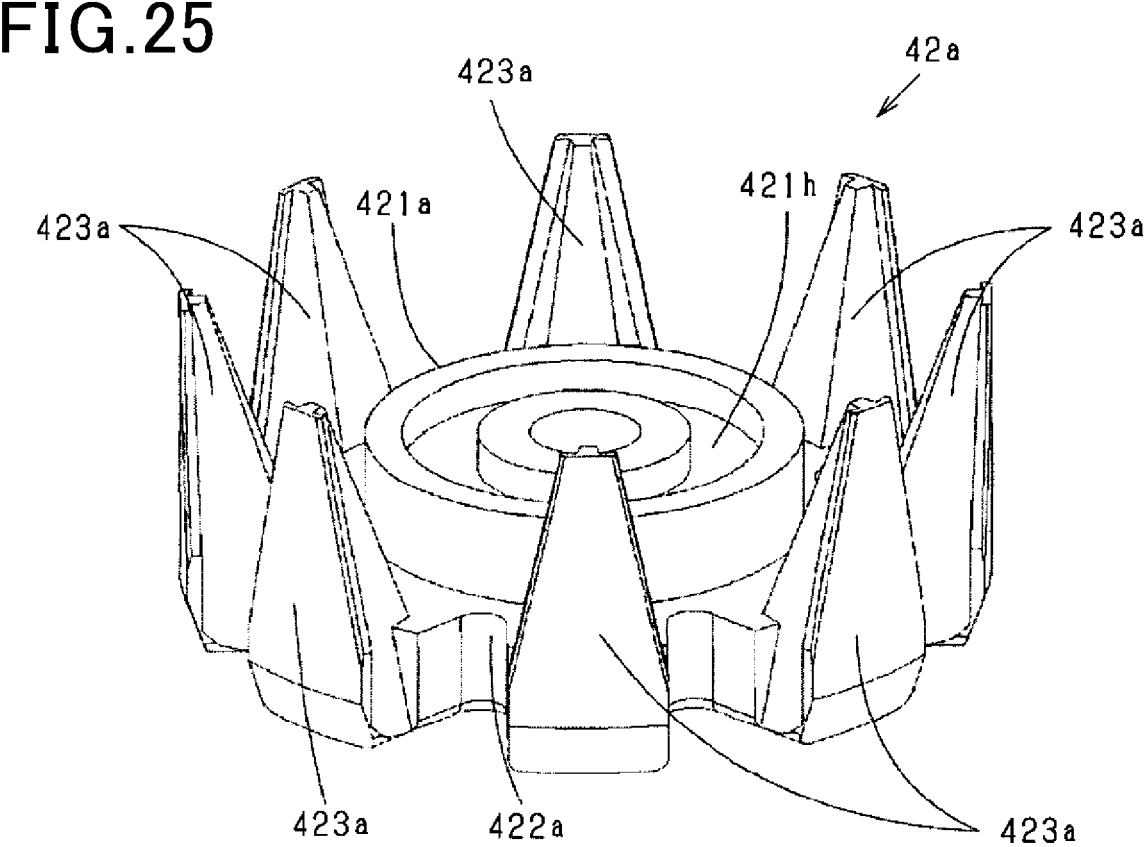
FIG. 25 is a perspective view of a field core according to another embodiment.
Figure 26:
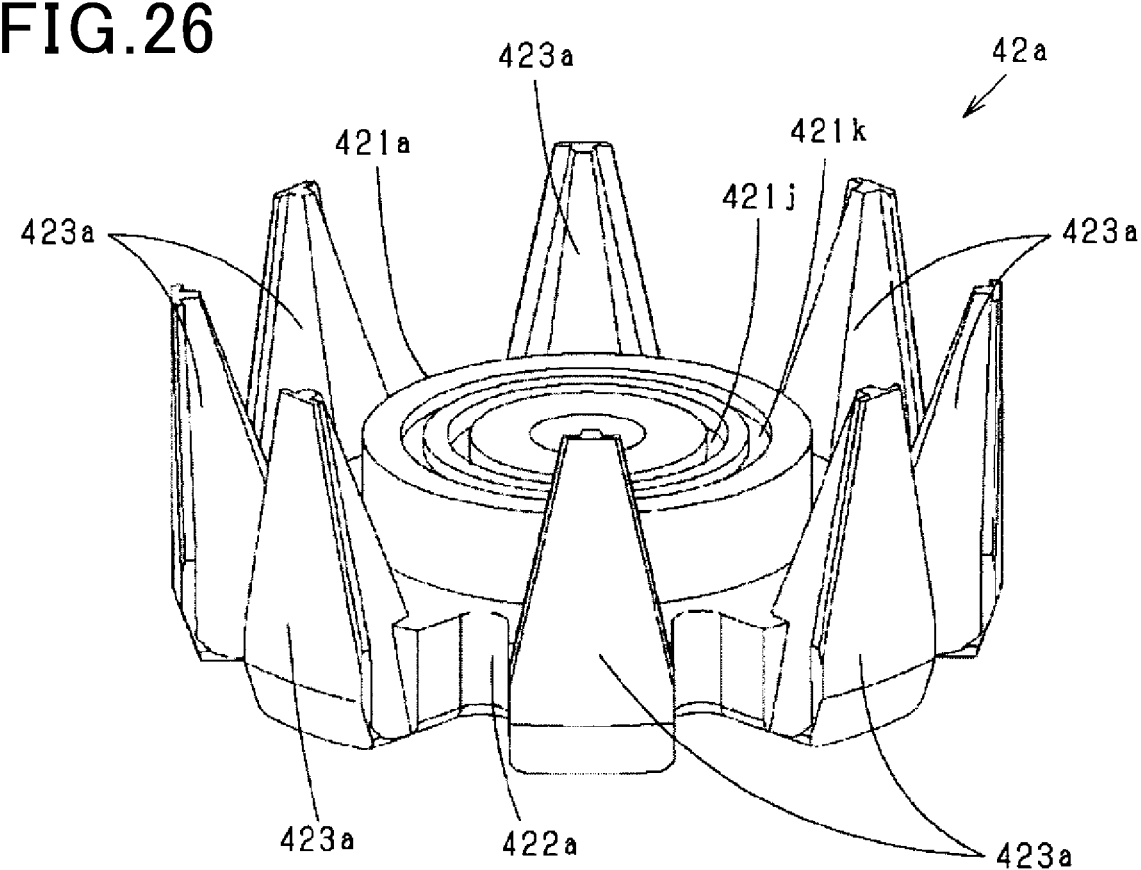
FIG. 26 is a perspective view of a field core according to another embodiment.

As shown in FIG. 25, an annular groove portion 421h extending in the circumferential direction may be formed at an end portion on the opposite side of the first disk part 422a in the first boss part 421a. Note that, a plurality of the groove portions may be formed as shown in FIG. 26. FIG. 26 shows two annular groove portions 421j and 421k.

For example, by using the configuration shown in FIGS. 19 to 26, it is possible to change the permeance locally in a portion other than a claw-like magnetic pole part where the permeance is desired to be maintained high in the field core, while maintaining a high saturated magnetic flux density, that is, a high magnetic permeability in the claw-like magnetic pole part. Therefore, influence on the performance of the rotary electrical machine 10 can be reduced.

Figure 27:
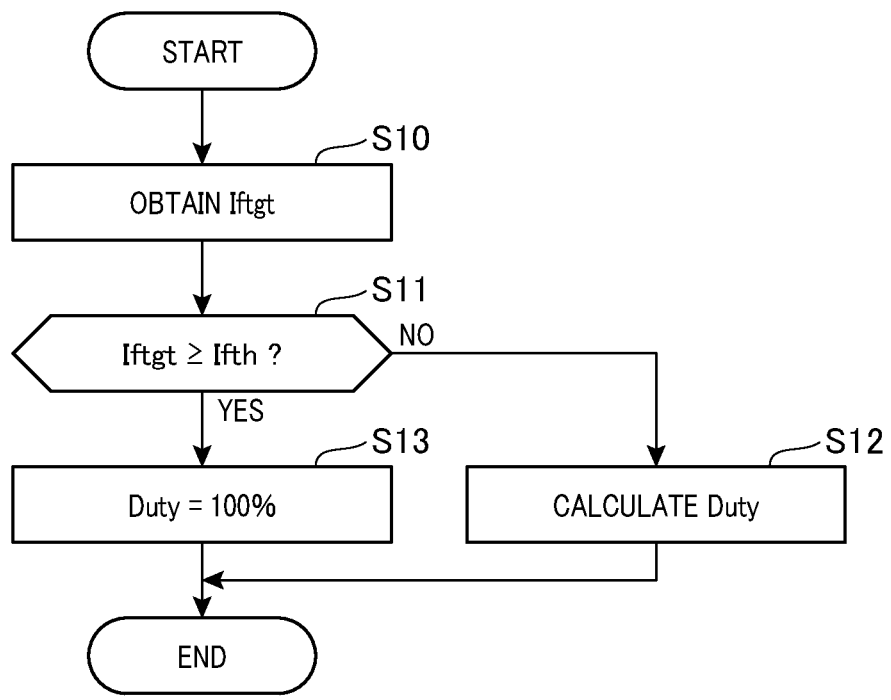
FIG. 27 is a flowchart showing a processing procedure of a controller according to another embodiment.

When the duty ratio Duty set in the duty calculating part 55d has reached the duty ratio Duty corresponding to the field threshold Ifth, processing of raising the duty ratio Duty to 100% may be performed. FIG. 27 shows this processing procedure. The processing shown in FIG. 27 is executed by the controller 55, for example, at each predetermined processing cycle.

In step S10, a field command current Iftgt is obtained. In subsequent step S11, it is determined whether the obtained field command current Iftgt has reached the field threshold Ifth. When the negative determination is made in step S11, the process proceeds to step S12, where the duty ratio Duty is calculated with the method shown in FIG. 11. On the other hand, when the affirmative determination is made in step S11, the process proceeds to step S13, where the duty ratio Duty is raised to 100%, for example, in a stepwise manner.

After the field current Ifr has reached the field threshold Ifth, even if the field current Ifr is increased furthermore, the inductance of the field winding 43 does not change so much as shown in FIG. 10. For this reason, in a case where high priority is desired to be given to start-up of electric power generation of the rotary electrical machine 10, when the field current Ifr has reached the field threshold Ifth, if resistance to overheat of the switching element 53a is large, it is desirable to raise the duty ratio Duty to 100% at once. Then, processing shown in FIG. 27 is performed. Since the duty ratio Duty is set to 100%, the switching element 53a is not turned on/off, and the ripple of the field current due to on/off switching of the switching element 53a does not occur. Therefore, it is possible to give priority to start-up of electric power generation of the rotary electrical machine 10 while suppressing the ripple of the field current.

The permanent magnet 44 may not be provided in the rotor 40, In this case, reduction of the inductance of the field winding 43 relative to increase of the field current may be noticeable.

Note that, when the permanent magnet 44 is not provided, since the amount of ampere-turns Ir of the field winding 43 at which magnetic saturation of the field core 42 occurs is made lower than the amount of ampere-turns Is of the armature winding 32 at which magnetic saturation of the stator core 31 occurs, reduction of the time constant on the side of the rotor 40 including the field winding 43 is noticeable. In addition, when the permanent magnet 44 is not provided, since the saturated magnetic flux quantity Φr of the field core 42 is made smaller than the saturated magnetic flux quantity Φs of the stator core 31, the above reduction of the time constant is noticeable. In this case, the merit of including the limiter 55b shown in FIG. 11 is large.

As the rotary electrical machine, not only the one used only as a power generator, but also, for example, the one used as a power generator or an electric motor, such as ISG (integrated Starter Generator), or the one used only as an electric motor may be used. In addition, as the rotary electrical machine, it is not limited to the one mounted on a vehicle.

The present disclosure is described according to working examples, but it should be understood that the present disclosure is not limited to the working examples and structures. The present disclosure also includes various variations and modifications within an equivalent range. In addition, various combinations and forms, and further other combinations and forms including only one element, more than that or less than that in addition to the various combinations and forms are also included in a category and concept of the present disclosure.

What is claimed is:
1. A rotary electrical machine comprising:
an annular stator having a stator core around which an armature winding is wound; and
a rotor arranged on an inner circumference side of the stator, wherein:
the rotor includes:
a field core including a cylindrical boss part and a plurality of claw-like magnetic pole parts (i) arranged on an outer circumferential side of the boss part and (ii) having magnetic poles with alternately different polarities formed in a circumferential direction of the rotor, and a field winding that is wound on the outer circumferential side of the boss part and generates a magnetomotive force by supplying a field current;

in a case where
(i) a magnetic circuit in which a magnetic flux formed by a magnetomotive force of the field winding flows and which passes through a d-axis via the boss part, a pair of the claw-like magnetic pole parts and the stator core is referred to as a d-axis magnetic circuit, and (ii) a magnetic circuit which is formed by a current flowing through the armature winding and which passes through a q-axis shifted by 90° in an electric angle from the d-axis is referred to as a q-axis magnetic circuit, a permeance of the q-axis magnetic circuit is larger than a permeance of the d-axis magnetic circuit;

the rotary electrical machine further comprises:
a switch provided so as to (i) supply power from a power source to the field winding by being turned on and (ii) stop supplying power from the power source to the field winding by being turned off; and a controller that, in a case where
(i) a ratio of an on-time to one switching cycle of the switch is defined as a duty ratio, and
(ii) a duty ratio which is larger than the duty ratio corresponding to the field current that gives a maximum reduction amount of inductance of the field winding with respect to an increasing amount of the field current in a range that the field current can take and which has a value less than 100% is set as a predetermined value, calculates the duty ratio on a condition that an upper limit of the duty ratio is set as the predetermined value and turns on/off the switch based on the calculated duty ratio; and the controller sets the predetermined value to increase as (i) a rotation speed of the rotor increases or (ii) a d-axis current flowing through the armature winding increases.

2. The rotary electrical machine according to claim 1, wherein
the rotor includes a permanent magnet (i) arranged between ones of the claw-like magnetic pole parts adjacent to each other in a circumferential direction, (ii) having an axis of easy magnetization directed in the circumferential direction of the rotor, and (iii) having magnetic poles formed so that their polarities match polarities that are alternately induced in the claw-like magnetic pole parts due to the magnetomotive force of the field winding.

3. The rotary electrical machine according to claim 2, wherein
an amount of ampere-turns of the field winding at which magnetic saturation of the field core occurs is lower than an amount of ampere-turns of the armature winding at which magnetic saturation of the stator core occurs.

4. The rotary electrical machine according to claim 2, wherein
a saturated magnetic flux quantity of the field core is smaller than a saturated magnetic flux quantity of the stator core.

5. The rotary electrical machine according to claim 2, wherein
a surface area of a surface opposite to the stator in the rotor is larger than a value obtained by dividing (i) a sectional area of the boss part when the boss part is seen in its axial direction by (ii) a number of pole pairs of the rotary electrical machine.

6. The rotary electrical machine according to claim 1, wherein
an amount of ampere-turns of the field winding at which magnetic saturation of the field core occurs is lower than an amount of ampere-turns of the armature winding at which magnetic saturation of the stator core occurs.

7. The rotary electrical machine according to claim 1, wherein
a saturated magnetic flux quantity of the field core is smaller than a saturated magnetic flux quantity of the stator core.

8. The rotary electrical machine according to claim 1, wherein
one part of a magnetic path sectional area of the field core is smaller than another part of the magnetic path sectional area so that a permeance of the q-axis magnetic circuit is larger than a permeance of the d-axis magnetic circuit.

9. The rotary electrical machine according to claim 1, comprising:
an inverter electrically connected to the armature winding, wherein the controller controls the inverter so that the field current is larger than the d-axis current.

10. The rotary electrical machine according to claim 9, wherein
the controller controls the inverter so that the field current increases as the d-axis current increases.

11. A rotary electrical machine comprising:
an annular stator having a stator core around which an armature winding is wound; and
a rotor arranged on an inner circumference side of the stator,
the rotor including a field core and a field winding that generates a magnetomotive force by supplying a field current, wherein:
the field core includes:
a cylindrical boss part that is closer to an inner circumference side of the rotor than the field winding;
a plurality of disk parts (i) extending outward in a radial direction of the boss part from one axial end of the boss part and (ii) provided at a predetermined angular interval in a circumferential direction of the boss part; and
a plurality of claw-like magnetic pole parts (i) extending in an axial direction of the boss part so as to surround the field winding from tips of the disk parts and (ii) having magnetic poles with alternately different polarities formed in a circumferential direction of the rotor;
when (i) a value obtained by dividing a sectional area of the boss part when the boss part is seen in its axial direction by a number of pole pairs of the rotary electrical machine is Ab, (ii) a sectional area of the disk part is Ad, (iii) a sectional area of an annular yoke constituting the stator core is Acb, and (iv) a sectional area of a tooth per magnetic pole of a plurality of teeth constituting the stator core is At, a smaller one of Ab and Ad is larger than a smaller one of Acb and At;
the rotary electrical machine further comprises:

a switch provided so as to (i) supply power from a power source to the field winding by being turned on and (ii) stop supplying power from the power source to the field winding by being turned off; and a controller that, in a case where
- (i) a ratio of an on-time to one switching cycle of the switch is defined as a duty ratio, and
- (ii) a duty ratio which is larger than the duty ratio corresponding to the field current (Ifa) that gives a maximum reduction amount of inductance of the field winding with respect to an increasing amount of the field current in a range that the field current can take and which has a value less than 100% is set as a predetermined value, calculates the duty ratio on a condition that an upper limit of the duty ratio is set as the predetermined value and turns on/off the switch based on the calculated duty ratio; and the controller sets the predetermined value to increase as (i) a rotation speed of the rotor increases or (ii) a d-axis current flowing through the armature winding increases.

12. The rotary electrical machine according to claim 11, wherein
the rotor includes a permanent magnet (i) arranged between ones of the claw-like magnetic pole parts adjacent to each other in a circumferential direction, (ii) having an axis of easy magnetization directed in the circumferential direction of the rotor, and (iii) having magnetic poles formed so that their polarities match polarities that are alternately induced in the claw-like magnetic pole parts due to the magnetomotive force of the field winding.

13. The rotary electrical machine according to claim 12, wherein
an amount of ampere-turns of the field winding at which magnetic saturation of the field core occurs is lower than an amount of ampere-turns of the armature winding at which magnetic saturation of the stator core occurs.

14. The rotary electrical machine according to claim 12, wherein
a saturated magnetic flux quantity of the field core is smaller than a saturated magnetic flux quantity of the stator core.

15. The rotary electrical machine according to claim 12, wherein
a surface area of a surface opposite to the stator in the rotor is larger than a value obtained by dividing (i) a sectional area of the boss part when the boss part is seen in its axial direction by (ii) a number of pole pairs of the rotary electrical machine.

16. The rotary electrical machine according to claim 11, wherein
an amount of ampere-turns of the field winding at which magnetic saturation of the field core occurs is lower than an amount of ampere-turns of the armature winding at which magnetic saturation of the stator core occurs.

17. The rotary electrical machine according to claim 11, wherein
a saturated magnetic flux quantity of the field core is smaller than a saturated magnetic flux quantity of the stator core.

18. The rotary electrical machine according to claim 11, wherein
one part of a magnetic path sectional area of the field core is smaller than another part of the magnetic path sectional area so that a permeance of the q-axis magnetic circuit is larger than a permeance of the d-axis magnetic circuit.

19. The rotary electrical machine according to claim 11, comprising:
an inverter electrically connected to the armature winding, wherein the controller controls the inverter so that the field current is larger than the d-axis current.

20. The rotary electrical machine according to claim 19, wherein
the controller controls the inverter so that the field current increases as the d-axis current increases.

* * * * *